United States Patent
Gee et al.

(10) Patent No.: US 6,317,872 B1
(45) Date of Patent: Nov. 13, 2001

(54) REAL TIME PROCESSOR OPTIMIZED FOR EXECUTING JAVA PROGRAMS

(75) Inventors: John K. Gee, Mt. Vernon; David A. Greve; David S. Hardin, both of Cedar Rapids; Raymond A. Kamin, Marion; T. Douglas Hiratzka, Coralville; Allen P. Mass, Lisbon; Michael H. Masters; Nick M. Mykris, both of Cedar Rapids, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/056,048

(22) Filed: Apr. 6, 1998

Related U.S. Application Data

(63) Continuation-in-part of application No. 08/890,813, filed on Jul. 11, 1997, now abandoned.

(51) Int. Cl.[7] .................................................. G06F 9/45
(52) U.S. Cl. ...................... 717/7; 717/5; 707/206; 711/206; 712/202; 712/209
(58) Field of Search ....................... 395/707, 705, 395/702, 706, 708; 711/6, 203, 206, 209; 712/202, 200, 208, 209; 707/206, 205

(56) References Cited

U.S. PATENT DOCUMENTS

| | | | |
|---|---|---|---|
| 5,280,613 | * | 1/1994 | Chan et al. . |
| 5,367,685 | * | 11/1994 | Gosling ................................ 395/707 |
| 5,787,431 | * | 7/1998 | Shaughnessy ........................ 707/100 |
| 5,873,105 | * | 2/1999 | Tremblay et al. .................... 707/206 |
| 5,911,069 | * | 6/1999 | Beard .................................... 709/303 |

OTHER PUBLICATIONS

Plezbert et al., "Does "Just in Time"= "Better Late Than Never"?", Proceedings of the 24th ACM SIGPLAN-SIGACT symposium on Principles of programming languages, Jan. 15–17, 1997, Paris France, pp. 120–131.*

Tim Lindholm, Frank Yellin, "The Java Vitrual Machine Specification," JavaSoft ISBN 0–201–63452–X, Sep. 1996.*

* cited by examiner

Primary Examiner—Kakali Chaki
Assistant Examiner—Tuan Q. Dam
(74) Attorney, Agent, or Firm—Nathan O. Jensen; Kyle Eppele; J. P. O'Shaughnessy

(57) ABSTRACT

An improved computer architecture and system advantageously combine the beneficial characteristics of a high level object oriented programming language with an optimized processor for efficient application to real time embedded computing problems. Additionally, an improved method for resolving symbolic references in code generated by compiling source code written in an object oriented programming language to the corresponding logical memory addresses stores look-up information with the object itself after the first encounter of a given symbolic reference, whereby the logical memory address information is available for subsequent encounters of the symbolic reference, and whereby no modification of the program instructions containing the symbolic reference is necessary. In a preferred embodiment, the Java™ programming language is used.

35 Claims, 14 Drawing Sheets

REAL TIME PROCESSOR OPTIMIZED FOR EXECUTING JAVA PROGRAMS

CROSS REFERENCES TO RELATED APPLICATIONS

This application is a continuation in part of "Microprocessor Architecture and System", by John Gee, application Ser. No. 08/890,813 filed Jul. 11, 1997, now abandoned, assigned to the same assignee as the present application.

FIELD OF THE INVENTION

The present invention relates generally to computer systems which operate in real-time. More particularly, the present invention relates to real-time processors capable of running JAVA™ programs (JAVA is a trademark of Sun Microsystems, Inc.).

BACKGROUND OF THE INVENTION

Electronic systems, such as, computerized devices or computer controlled apparatus, are employed in dramatic numbers to perform various operations in diverse applications. These electronic systems range in complexity from simple consumer products, such as, home appliances and children's toys to complex arrangements, such as, aircraft autopilot systems, chemical processing controls or safety devices for complicated applications. Many of these electronic systems rely on internal, or embedded, computers for at least a portion of their functionality.

Such embedded computer systems often carry out such operations as sensing, computation, display, and control in response to stimuli from internal and external sources. Certain sensing and control applications have demanding speed requirements which can be described as "real time" speed requirements. Real time speed requirements demand that the embedded computer system responded to events or stimuli within a strict, specified amount of time. For example, embedded computer systems are utilized in most modern automobiles to control tasks, such as, fuel injection, anti-lock braking, air bag deployment, engine ignition, anti-lock braking, air bag deployment, engine ignition and other operations.

The amount of time allowed for computer response is generally very small. For example, an embedded computer system must rapidly analyze deceleration data to accurately and appropriately deploy an air bag in an automobile. This ability to meet stringent timing requirements often requires that processing resources be available upon demand in a predictable amount of time. Consequently, real-time computer systems typically utilize specialized and complex software to meet real time speed requirements. Many prior art real-time systems have been programmed in relatively "low-level" languages, such as assembly language, so that the programmer can maintain the strict control over the system operation which is necessary to meet the strict time requirements.

A significant consideration in the performance and effectiveness if a real-time computer system is the programming language methodology that is used to create and maintain the software elements that ultimately determine the functionality of the embedded computer system. With present day hardware fabrication costs, the software development costs often far outweigh the hardware costs. Consequently, it would be advantageous to reduce software development and maintenance costs. One problem with programs written in low-level languages is that they are often costly to develop and difficult to maintain.

A wide range of programming methods and languages have historically been used to develop the software elements or programs. The programming methods have ranged from the previously-discussed low level machine specific assembly languages to high level languages which are not specific to a particular hardware element or platform. Generally, high level languages are more efficient in both the design and maintenance of software programs so that their use is particularly advantageous. A broadly emerging type of programming methodology which promises to offer even more favorable efficiencies in program development and maintenance is object oriented programming software design. Object oriented programming software design is based on the concept of extracting particular characteristics from some item of interest along with a set of operations that may be performed on that information and grouping those pieces together to form an object. There are several benefits that may be realized by the implementation of a computer system in an object oriented programming environment. For example, compiler output including both generated program code and symbolic object references may be directly received, stored and integrated into an existing runtime system without further coordination with the already resident program and object references in the system. This capability is of significant value when large programs are created in pieces by large teams of programmers. Currently available object oriented programming languages include ADA 95, C, C++ and JAVA™ languages.

The JAVA programming language was created and propagated by Sun Micro Systems, Inc. to meet the need for an object oriented, platform independent and network enabled programming environment. The JAVA language has been quickly embraced by the computer software community and has been demonstrated to be efficient and robust for a wide variety of general purpose computing applications while generally providing improved development productivity. The successful performance of the JAVA programming language has resulted in a great interest in the use of the JAVA programming language for a wide variety of computing applications, including real time, embedded computing applications.

A program written in the JAVA language is compiled from the JAVA source code into as a series of platform independent commands called "bytecodes." Generally, a JAVA host computer system utilizes a JAVA run time environment to interpret and execute the bytecodes. The JAVA run time environment is called a "JAVA virtual machine" (JVM) and it can either interpret the bytecodes directly or use a "just-in-time" compiler to convert the bytecodes to platform dependent codes which run directly on the host platform. The JVM allows a flexible run-time environment.

However, in some aspects the JAVA language and the JVM are not well suited for real-time embedded processors. A conventional JVM is created with the expectation that it will be utilized on a hardware platform (general purpose computer system) with large random access memory (RAM) storage and high-speed performance. Due to this expectation, JAVA programs often include unused methods, fields and constants. Although the storage of unused methods, fields and constants is not problematic in general purpose computing systems where large amounts of memory are available, the storage of unused methods, fields and constants is a problem in embedded applications due to limited operation times and memory. Additionally, JAVA programs often rely on calls (e.g. invokes) to subroutines or methods. These calls to subroutines can require additional space and time when compared to an assembly language performance of the subroutine. Conventional JAVA compilers do not provide a mechanism for replacing slower JAVA subroutines with faster subroutine assembly code functions.

Further, the JAVA language has certain characteristics which make it difficult to use in embedded processing environments which use ROM storage for program code. In particular, JAVA programs utilize an object referencing mechanism, whereby symbolic references to objects are embedded in JAVA bytecode sequences. The symbolic references are typically employed to access a table of logical locations of the referenced objects that provide the information needed to address the objects. In a typical referencing operation, after the first access to an object, the logical location of the object is stored and the program code is modified so that subsequent accesses can bypass the symbolic reference resolution process and use the stored value. In embedded systems which store the program code in ROM, the program code cannot be modified to change the symbolic resolution process.

Further, the interpretation of the bytecodes by a processor running another process, such as occurs in the JVM, is inherently speed inefficient. In applications where higher performance or lower power consumption is required, this inefficiency may be intolerable.

Finally, the JVM definition for operation with the JAVA language requires the existence of an automatic storage management system called a "garbage collector" which automatically reclaims storage that is no longer in use. Most conventional garbage collectors are known to be a significant problem for embedded real time applications because the garbage collection process requires a significant period of time and must be properly completed before applications attempt to access objects in storage. Accordingly, the processor is essentially unavailable while the garbage collection process is active and reclaiming unused storage and other application programs must be halted until the garbage collection task is complete.

Thus, there is a need for a processor which can be used in real-time embedded applications which can efficiently run JAVA programs in order to reduce program development time and program maintenance costs.

SUMMARY OF THE INVENTION

The present invention teaches a unique combination of a JVM runtime environment with an optimized real time embedded environment in which the environments have a high degree of interaction while retaining the critical characteristics of each environment. In this system, a JAVA Application or Applet operates in a typical JAVA runtime environment in which JAVA compatible data formats and processor operations are used. However, the structure of the data formats and operations are implemented in a manner specially designed to meet the requirements of real time embedded applications.

In one embodiment, a special storage management mechanism is used which can accommodate garbage collection as required by JAVA and still operate in a real time environment. In particular, garbage collection is accommodated by an indirect referencing technique which can be bypassed for objects necessary for real time operation.

In another embodiment, an improved symbolic to logical reference resolution method performs the function of converting symbolic references into logical addresses without changing instructions or reference information in the instruction sequence. Instead, the resolution information for an object is included within the object itself, so any other procedures that might access the object gain the speed advantage of the symbolic to logical resolution that has been performed on the object by the first procedure to reference that object. No modification of the sequence of program instructions is needed, so the program sequence can be stored in lower cost read-only memory (ROM) if desired. Also, since the program sequence is unchanged, checksum methods can be used to insure the integrity of the read-only memory contents for enhanced system reliability which, in turn, may significantly reduce costs associated with the certification of critical systems that operate in accordance with the principles of the invention.

DETAILED DESCRIPTION OF THE PREFERRED EMBODIMENT

Figure 1:
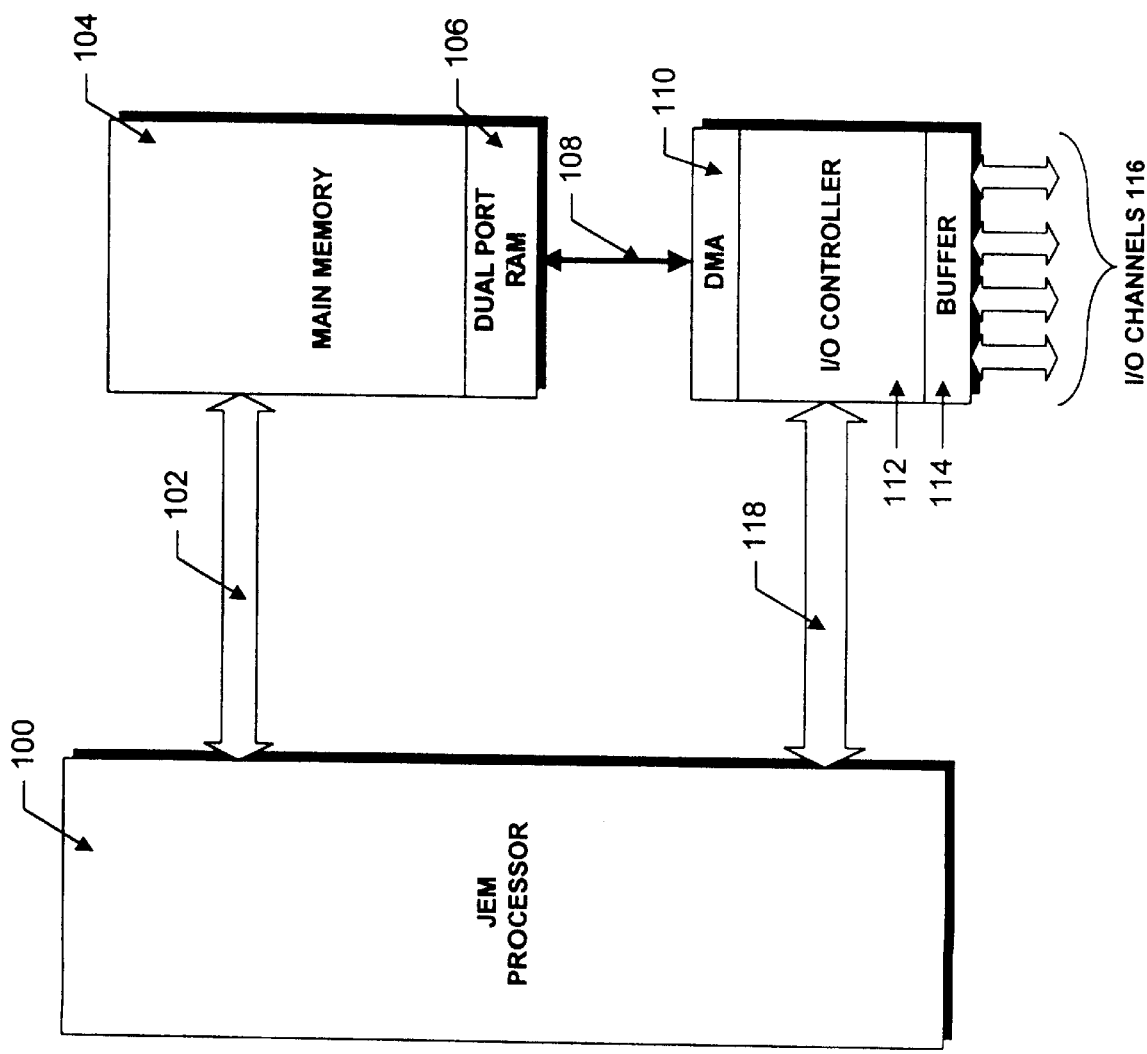
FIG. 1 is a block schematic diagram showing the inventive processor system including a microprocessor, memory and I/O controller.

As previously mentioned, a JAVA host computer system utilizes a so-called "virtual machine" when a compiled JAVA program is executed on a host platform which has a native programming environment that is unrelated to JAVA. The execution of the JAVA program may be by either interpreting the bytecodes, or by using a Just-In-Time (JIT) compiler to generate machine language instructions which may be executed directly by the host platform.

In particular, a JAVA application program, such as the following "hello world" program:

```
class hello {
    public static void main (String argv []) {
        System.out.println ("Hello!");
    }
}
``` must first be statically compiled by a JAVA compiler, which turns the JAVA code into bytecodes and puts the bytecodes into a "hello.class" file. This class file can then be interpreted on any machine which has a JVM running on it.

The JVM processes each of the bytecodes in the hello.class file and executes them in a manner similar to the interpretation performed by other interpreted languages, such as Basic, LISP, and Smalltalk. When a JIT compiler is present, after reading in the hello.class file for interpretation, the JVM forwards the hello.class file to the JIT compiler. The JIT compiler then takes the bytecodes and compiles them into native code for the host machine. The compiler is "just in time" because it compiles code for methods on a method by method basis just before they are called. The JIT compiler is used because compiling the bytecodes and running the resulting executable code may be faster than interpreting the bytecodes. For example, if the application program calls the same method more than once, the method code does not have to be recompiled—the processor can simply re-execute the already -compiled native code. The JIT compiler is an integral part of the JVM, so it is transparent to the user.

The JVM is an abstract computing machine, but, like a real computing machine, it has an instruction set and uses various memory areas. The JVM does not actually execute the JAVA programming language. Instead, it operates on a class file having a specific format. A class file contains JVM instructions (or bytecodes) and a symbol table, as well as other ancillary information. For the sake of security, the JVM imposes strong format and structural constraints on the code in a class file. However, any language with functionality that can be expressed in terms of a valid class file can be executed by the JVM.

Each class file must have a method called "main". A JVM starts execution by invoking the method "main" of some specified class and passing it a single argument, which is an array of strings. This invocation causes the specified class to be loaded, linked to other types that it uses, and initialized. The initial attempt to execute the method "main" of a class may result in the discovery that the class is not loaded—that is, the JVM does not currently contain a binary representation for the class. The JVM then uses a "classloader" object to attempt to find such a binary representation. If this process fails, an error is thrown.

After the class to be executed is loaded, it must be initialized before the method main can be invoked. Initialization involves the step of linking, and linking, in turn, involves the steps of verification, preparation, and (optionally) resolution. The verification step checks that the loaded class representation is "well formed", with a proper symbol table. The verification step also determines whether the code that implements the class obeys the semantic requirements of the JVM. If a problem is detected during verification, an error is thrown. Preparation involves allocation of static storage and the creation of any data structures, such as method tables, that are used internally by the JVM. If a problem is detected during preparation, an error is also thrown.

The resolution step includes the process of checking symbolic references from the class being executed to other classes and interfaces. If the referenced classes are not in the JVM, they are loaded and checked to make sure that the references in these other classes are correct. The resolution step is optional at the time of initial linkage. For example, a class implementation may resolve all symbolic references from the referenced classes and interfaces immediately at linking (This resolution may result in errors from further loading and linking steps.) This implementation choice operates in a manner similar to the static linking operation that has been done for many years in programs written in compiled languages, such as the C language.

Alternatively, a class implementation may resolve symbolic references only when they are actually used. Consistent use of this strategy for all symbolic references would represent a "lazy" resolution. In this case, if the class being executed had several symbolic references to another class, the references might be resolved one at a time as they were used. The references might not be resolved at all, if they were never used during execution of the program.

Like the JAVA language, the JVM operates on two data types: primitive data and reference data. These data types can be stored in variables, passed as arguments, returned by methods, and operated upon. The JVM expects that nearly all type checking will be done at compile time and therefore does not perform type checking itself. In particular, data need not be tagged or otherwise be inspectable to determine its type. Instead, each instruction used by the JVM is designed to work with a particular data type which can be determined from the instruction name. For example, the JVM instructions, iadd, ladd, fadd, and dadd all add together two numeric values, but they operate with operands whose types are int, long, float, and double, respectively.

The JVM also supports objects, which are either dynamically allocated class instances or arrays. A reference to an object is considered to have the JVM type "reference" which is similar to a "pointer" to the object. More than one reference to an object may exist. Although the JVM performs operations on objects, it always operates on, passes, and tests objects via values of type "reference".

The JVM is actually composed of one or more threads. Each JVM thread has a private JAVA stack, created at the same time as the thread, which stores JVM frames. A JAVA stack is the equivalent of the stack of a conventional programming language such as C. The JAVA stack holds local variables and partial results, and plays a part in method invocation and return. The JVM specification permits JAVA stacks to be of either a fixed or a dynamically varying size. The JVM also has a method area that is shared among all threads.

The method area is analogous to a "storage area" for compiled code used by a conventional language, or to the "text" segment of a UNIX process. It stores data structures which are created for each class, such as a "constant pool", field and method data, and the code for constructors and methods, including special methods that are used in class and instance initialization and interface type initialization. The method area is created when the JVM starts. The method area may be compacted by garbage collection or may not be compacted. Further, the method area may be of a fixed size, or may be expanded as required by the computation and may be contracted if a larger method area becomes unnecessary.

The aforementioned constant pool is a per-class or per-interface runtime representation of a constant_pool table always found in a JAVA class file. The constant pool contains several kinds of constants, ranging from numeric literals known at compile time to method and field references that must be resolved at run time. The constant pool serves a function similar to that of a symbol table for a conventional programming language, although it contains more data than is found in a typical symbol table. The constant pool for a class or interface is created when the JAVA class file for the class or interface is successfully loaded as previously described.

Sun Microsystems, Inc., has published a complete description of the JVM and its operation in a book entitled "The JAVA Virtual Machine Specification" (ISBN 0-201-63452-X) which is incorporated in its entirety herein.

For Internet related applications, the JVM interpreter and JIT compiler methodologies described above are of great interest since there are a significant number of personal computers in existence that are candidate platforms for JAVA capability. The only requirement for JAVA operability on a given platform is the presence of a JVM interpreter for that platform that correctly implements the runtime environment. The JVM is attractive because the creation of the JVM runtime environment is a task that need be completed only once for each type of platform, enabling a JAVA application developer to concentrate solely on application development instead of platform specific issues.

However, as previously mentioned, in a real-time embedded processor applications, the JVM has some significant drawbacks. Consequently, in such applications, another type of processor is often used in which the JAVA bytecodes generated by a JAVA compiler are executed directly on the platform. In this case, the JAVA bytecodes are the low level assembly language of the processor and the JAVA program could be said to be running on a "JAVA machine" rather than on a JVM. Such processors are called "direct execution" JAVA processors. Such processors are not inherently as flexible as the JVM implementation in the area of platform independence. However, the least common denominator between all of these runtime environments is the JAVA language itself, which is the primary vehicle for interoperability.

Direct execution JAVA processors can be of many types. However, the JVM has characteristics which make certain processor architectures more suitable for implementing a direct execution processor. In particular, the mechanism by which operands are addressed is of particular interest. Two common mechanisms are register oriented addressing and stack oriented addressing.

In a register oriented architecture, operands are temporarily stored in hardware registers and the processor must generate an address to identify the particular register or memory location that contains the operand to be used for the processor operation. A stack oriented architecture uses a Last-In, First-Out (LIFO) storage "stack" to contain operands for processing. This structure is often termed a "zero-address" mechanism, since no explicit address is used to either place information on the stack or to remove information from the stack. Operands are processed based solely their order in the stack.

Each of the described addressing mechanisms has advantages and disadvantages. The primary advantages of register oriented addressing are speed and ease of implementation. Since processor registers are typically implemented as an integral element of the processor core logic, access to the registers may be accomplished at very high speed. Multiple registers may be implemented with multiple data busses to allow a high degree of parallel access. The primary disadvantage of the register oriented architecture is the fact that there is a degree of complexity associated with the addressing of the registers for proper program execution. This complexity becomes particularly evident when high level languages are used that depend on machine generated code such as a compiler would generate. Since the register addressing mechanisms are typically limited, the burden of address resolution and management falls on the compiler. In many cases, an additional level of logic design is required to implement this function.

The benefit of the stack oriented architecture is most evident when a compiler generated high level language is used. The compiler needs only to correctly order the sequence of operations as operands are placed on the stack and used later for processing. This sequence of events is well suited to the respective nature of compiler generated code and results in an inherent efficiency of both memory size and execution speed. The historical disadvantage of the stack architecture is that the stack is typically implemented in external RAM and therefore generally requires a number of relatively slow sequential memory accesses to perform the processor operations.

Since the JVM uses stack based processing, a processor which also uses stack-based processing is a suitable candidate for a direct execution processor. An example of a stack oriented processor architecture that has seen broad product use since the early 1980's is the Rockwell Advanced Architecture Microprocessor (AAMP) family. The AAMP processor family has both 16-bit and 32-bit members and uses microcoded instruction set definitions to implement its instruction formats and data types. With suitable microprogramming and instruction set, the AAMP processor can be advantageously used as the inventive JAVA embedded microprocessor (JEM).

The inventive JEM is a microprogrammed machine wherein program control is carried out via a stored program (in ROM) rather than discrete sequential logic. This structure is illustrated in FIG. 1. The JEM processor 100 communicates with the ROM code memory 104 as illustrated by arrow 102. A small dual port RAM 106 may also be provided which is controlled by the direct memory access unit 100 as indicated by arrow 108. The processor 100 can also receive input and output signals via an I/O controller 112 as indicated by arrow 118. The I/O signals are communicated to the processor via I/O channels 116 which connect to I/O controller 112 by means of buffer 114.

Figure 2:
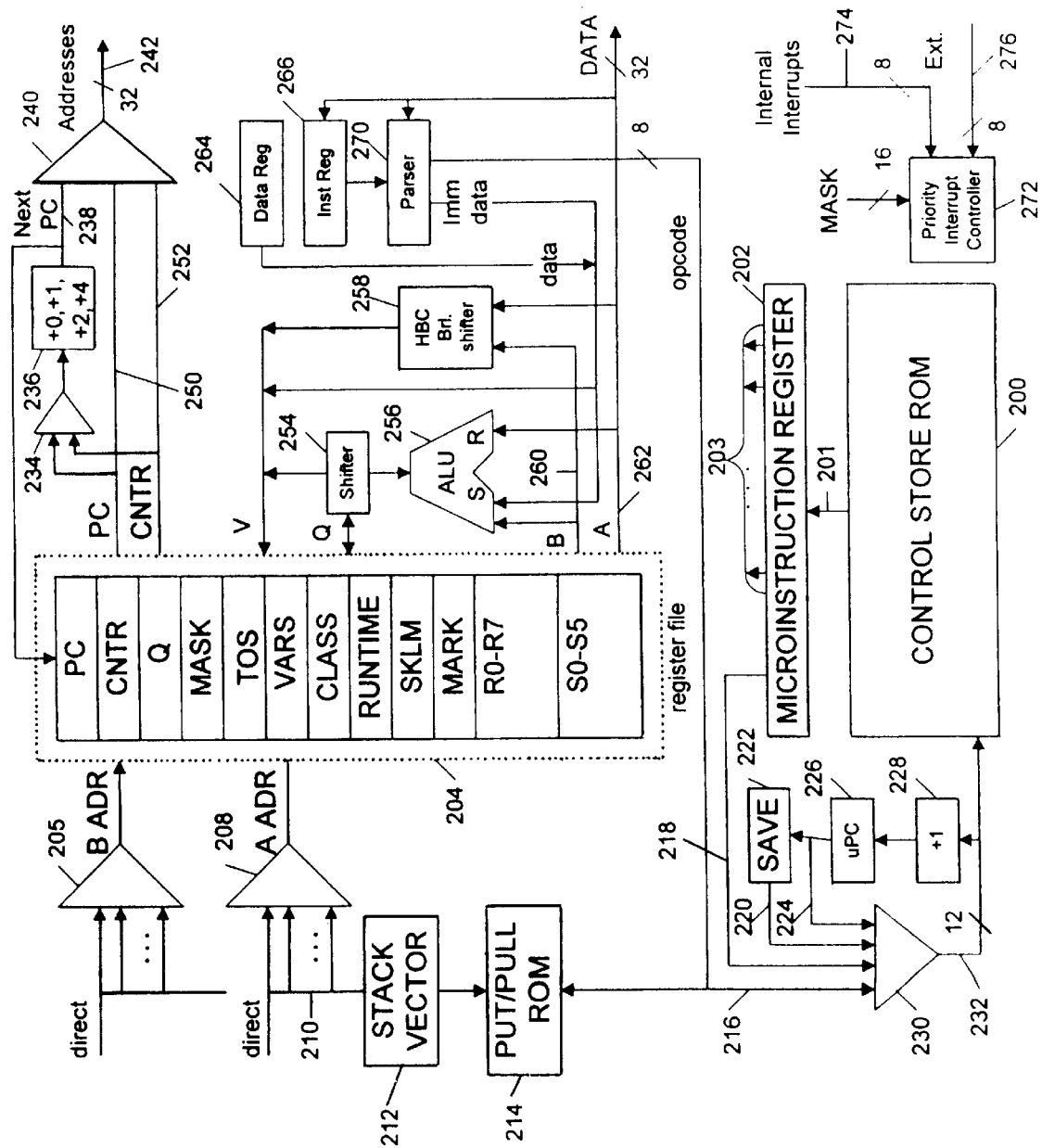
FIG. 2 is a more detailed block schematic diagram illustrating the internal hardware construction of the microprocessor.

The internal construction of the JEM processor is illustrated in FIG. 2. There are two levels of stored programs in the JEM system: one stored program is at the "micro" level using microinstructions in a control-store ROM 200, and the other stored program is at the "macro" level using bytecodes stored in a ROM code memory 104. The prefix "micro" will be used before elements which are involved with the microcoded portion of the processor to distinguish the processing of the "macro" bytecodes. In essence, each bytecode is interpreted as a pointer to a sequence of microinstructions which will actually be executed in place of the bytecode. Each microinstruction causes one or more elemental operations to occur in the machine, such as enabling a register to be loaded or selecting an ALU function to perform.

Instruction bytecodes are fetched from code memory 104 four at a time over 32-bit data bus 216 and stored in the instruction register 266. Execution begins with the translation of the "opcode" portion of the bytecode into a starting microprogram address. A microsequencer comprised of microinstruction register 202, selector 230, incrementer 228, microprogram register 226 and microinstruction register 222 then steps through locations in control-store 200 to cause proper execution of the instruction.

The control store 200 is implemented with a 2K×54 ROM with an optional expansion RAM (not shown.) Control store 200 contains microinstruction sequences for each of the JAVA bytecodes and for "internal" management processes, such as stack cache adjustment, initialization, interrupt servicing, and task management. The output 201 of the control store 200 is loaded into the microinstruction register 202 at the beginning of each microcycle. The microinstruction in register 202 can then be processed while the next microinstruction is being fetched. As a result of this "pipelining", microinstruction fetch and execution are overlapped. The register's outputs 203 configure the data paths and determine which operations are to occur during the current microcycle. If an interrupt is pending in interrupt controller 272, the microcontroller automatically vectors to a service microinstruction routine determined by the interrupt controller before executing the next instruction.

The control-store 200 receives a 12-bit microaddress 232 from the selector 230. At each microprogram step, the next microaddress is selected from selector 230 as the microsequencer output 232 from one of the following sources:

1. the output 224 of the microprogram counter 226 containing the address of the current microinstruction incremented by 1 (by incrementer 228), providing for sequential execution,
2. a 12-bit jump address 218 emanating from a field of the current microinstruction in register 202, providing for non-sequential access to the control store 200,
3. a save register 222 previously loaded with the contents of the microprogram counter 226 to establish a return linkage from a called microsubroutine.
4. the current opcode byte from the instruction register 266 (on bus 216), joined with three fixed bits depending on the type of mapping desired, providing for dispatching to an initial microprogram address, or
5. fixed vectors (not shown) that provide a starting microaddress for initialization, interrupt servicing, and stack cache adjustment (described below.)

The selector 230, and, accordingly, the selection of the next microinstruction to be executed, is generally controlled by a four-bit field of the current microinstruction. In some cases the selection by the sequencer is conditional on the state of a selected status line (not shown) that can be directly controlled by a test multiplexer (not shown) which allows for on-board testing. Conditional and unconditional jump and map operations can be initiated, along with unconditional call, return, and continue options.

A special acceleration feature of the JEM processor is the use of six stack registers (S0–S5) in on-board register file 204. Together, these registers function as a "cache" memory and act as an extension of the accumulator stack which would normally be located in external data memory 106. Registers S0–S5 each store one operand and minimize accesses to data memory 106 for accumulator stack operations. Experience has shown that, in about 95% of processing operations, the contents of the stack cache will include the operands necessary for immediate instruction execution. Thus, adjustments are rarely needed, and the throughput enhancement obtained greatly outweighs the overhead of cache maintenance.

The number and location of valid operands resident in the registers S0–S5 is maintained by a stack vector register 212.

A microinstruction sequence used to execute a particular JAVA bytecode assumes that the correct number of valid operands have been loaded into the registers S0–S5. For example, a microinstruction sequence which executes the "DUP" JAVA bytecode assumes that at least one valid operand is present in the registers S0–S5 but not more than five operands are present. As part of each microinstruction sequence, the microcontroller checks to determine if a "register stack" adjustment is needed by applying the opcode portion of the JAVA bytecode on bus 216 and the stack vector state in register 212 as an address to put/pull ROM 214. The output of ROM 214 indicates if execution can continue or if an adjustment to the cache is necessary.

If an adjustment is required, the microcontroller automatically enters one of two microinstruction sequences (as determined by ROM 214 output) that either access memory 104 to obtain an additional operand or to remove an excess operand from the cache by a "op" operation. Upon completion of stack adjustment, mapping is reinitiated to begin bytecode execution.

An 16-input priority interrupt controller 272 is included. Interrupt inputs are captured in a storage register (not shown) and a mask (MASK) from the register file 204 determines which interrupts will be recognized. A priority encoder (not shown) generates the identifying number of the highest-priority unmasked interrupt. Clear decoding logic (not shown) is employed to reset a capture flip-flop (not shown) corresponding to the interrupt being serviced.

A 32-bit data path provides the data manipulation and processing functions required to efficiently execute the JEM instruction set. Included in this data path are the data and address interface 262 and 242, address incrementers 236, instruction register 266, parsing logic 270, the arithmetic-logic unit (ALU) 256, shifters 254, and a multiport register file 204.

The register file 204 is a key element of the processor architecture. It has a multiport design which is important in achieving the parallelism needed for high execution speed and compact microcode. The A and B address inputs, 208 and 205, provide arbitrary selection of two source operands output on output A and output B, 262 and 260, respectively. The register location addressed by the B address input 205 is also a potential write destination. Separate ports are used for shifting a Q register (Q), providing a mask to the interrupt controller (MASK), and for external address generation. The outputs 250 and 252 of both the program counter register location PC and the counter register location CNTR are provided to a multiplexer 234 which generates an output to address incrementers 236. The incremented address 238 can be restored in register locations PC and CNTR and provided, via selector 240 on address bus 242 to the external memory 104 for accessing sequential information.

The output F of the ALU 256 is provided to a shifter element 254 and may be shifted a single-position to the left or right or multiple bits to the left and right. Eight shift linkages are provided to allow efficient implementation of integer and floating point multiplication and division, and error detection code computation. In addition to the single-bit shifter, a barrel shifter is provided. The barrel shifter allows for quick exponent extraction and normalization of floating point numbers and fast shift instructions. A hidden-bit counter is provided to determine the leading zeros in a floating point number.

The 32-bit ALU 256 provides addition, subtraction, shifting, priority encoding, logical operations, and indications of sign, all-zero, carry, overflow and detection of floating point Emax and Emin. The R and S inputs to the ALU are fed from multiplexing logic in order to provide several source alternatives. Included are variations of the register-file outputs, 32-bit data read from memory, immediate byte, short word, and word fields from the instruction stream, and microconstants. Carry control is provided to perform 64-bit arithmetic.

A 32-bit instruction register 266 receives four bytes from bytecode memory 104 for each fetch initiated. The incoming bytes are either opcodes, immediate data, or a combination of each. The parser element 270 separates the opcodes and data. Opcode bytes are passed to the microcontroller, via bus 216, to initiate microinstruction execution as discussed above. Immediate data bytes are sent to the ALU 256 as S-source operands. In this latter case, the parsing logic 270 also formats the immediate data to avoid shifting or masking through the ALU 256.

Because most instructions are one byte in length, the 32-bit instruction register 266 provides partial look-ahead. When the microcontroller is ready to start a new microinstruction sequence to execute another bytecode, the opcode portion of the bytecode is either in memory 104 or already fetched and resident in the register 266. The determination of whether the opcode is already resident in the register 266 is based on the two least-significant bits of PC and conditional logic decides when it is necessary to perform a fetch.

When the processor writes to memory 104, the operand is selected as the register file's 32-bit A-output port 262. Data read from memory 104 is synchronized by the 32-bit data register 264 and passed to the ALU 256 as an S source and subsequently into the register file 204 via the V input.

Another important JEM architecture consideration for efficient processing of JAVA bytecodes is the instruction set architecture. Since computers typically execute sequences of instructions to perform required computation and control functions, the types and speed of instructions that are executed determine the functionality; and performance of the computer. Instruction set architectures may be implemented in a number of ways ranging from pure combinational logic to sequential state machines or some combination thereof. In the JEM processor, the JAVA bytecodes are implemented by a microcoded state machine structure using a fast state machine with a relatively wide microcoded instruction word format to perform low level operations.

Figure 3:
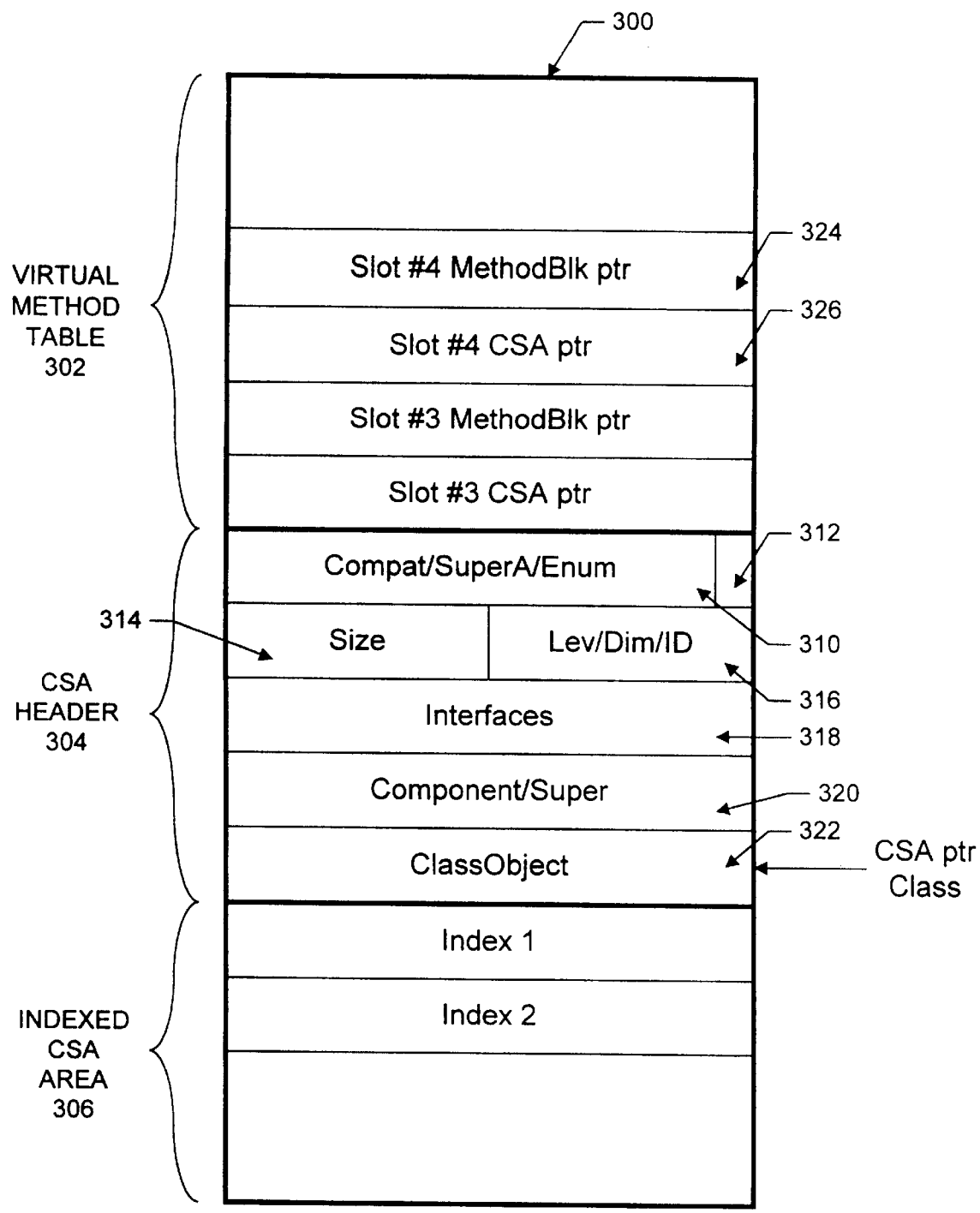
FIG. 3 is a schematic diagram of a class static area showing the contents thereof.

In addition to optimized processor and instruction set architecture, the JEM processor also uses data structures which are optimized for JAVA bytecode processing. In particular, "class" data structures are based on the class file structures defined by the JVM specification and discussed briefly above. The class data structures are optimized for efficient run-time operation and contain seven parts:
1. class static area (CSA) header
2. virtual method table
3. class indexed area
4. method blocks
5. class fields
6. superclass array
7. interface list The class static area, or CSA, forms the basis for a class definition and the organization of CSA data in memory is shown in FIG. 3. A CSA 300 contains a virtual method table 302, a CSA header 304, and a class indexed area 306. Entries in these three areas locate method blocks, class fields, an array indicating classes from which the class was extended (called a "superclass array"), and the interface list for the class. CSA 300 is a doubly-ended list structure in which each entry is comprised of a 32-bit word. The virtual method entries 302 are indexed at negative byte offsets from the CSA pointer 308 which indicates the location of the class static area and the class indexed area 306 is indexed at positive byte offsets from the CSA pointer 308. Each entry, or slot, in the virtual method table consumes two words.

The CSA header 304 is also located directly at, or at a negative byte offset from, the CSA pointer 308. The CSA header 304 consumes five words and overlaps the virtual method table 302.Therefore, virtual method table slot numbers 0 through 2 do not exist. Four types of CSA structures are used which differ in the contents of the CSA header 304:
1. ordinary class CSA which represents a class defined in class files;
2. interface class CSA which represents an interface defined in class files;
3. reference array CSA which is used to define singly- and multiply-dimensioned arrays of objects or interfaces; and
4. primitive array CSA which is used to define singly- and multiply-dimensioned arrays of primitive elements The CSA header 304 contains seven fields 310–322 which, in turn, can contain up to seven pieces of information. Some of the fields are overloaded and have different meanings according to the value of the Type field 312. The first field 310 contains information which identifies the CSA of a superclass for an ordinary class data structure, the CSA of the ultimate object of a reference array data structure or an enumeration value indicating the primitive data type for a primitive array CSA. This field is zeroed when the CSA is associated with an interface class. The superclass array identifies all superclasses of an ordinary class and contains an ordered list of superclass CSA pointers beginning with java/lang/Object at word index 0 and ending with the superclass of the present class. The superclass array pointer in the CSA for java/lang/Object is a null pointer.

The next field 314 identifies the size in 32-bit words of an instance of an object of the class when the CSA represents ordinary classes and contains a size code which is used by the processor microcode to quickly adjust the index or size of an array to a physical byte offset in the case of a primitive array CSA. This field is zeroed for interface classes and reference array classes.

The next field 316 contains a value which indicates the number of levels from java/lang/Object in a CSA which represents an ordinary class. For CSAs associated with interface classes, this field holds a unique interface ID. For CSAs associated with reference and primitive arrays, this field holds a value which indicates the number of dimensions of the array class.

The interfaces field 318 contains a pointer to a list of interfaces implemented by the associated class and interfaces implemented by all superclasses of this class (the interfaces list is discussed below.) The interfaces pointer is "null" if this class, and all of its superclasses, implement no interfaces. The next field 320 contains a value which identifies the superclass array for a CSA associated with an ordinary class and contains a value which identifies the CSA for a component of the reference and primitive array classes. This field is zeroed for a CSA which represents an interface class. The ClassObject field 322 holds a pointer to an object for this class identifying a lock control block for synchronized static methods of this class and other class information. The structure of this class object is defined by java/lang/Class definition. The CSA pointer in class objects points to the CSA for java/lang/Class.

The virtual method table 302 has entries that locate all the virtual methods that may be invoked on objects of the type contained in the class represented by the CSA structure 300.

These methods include the virtual methods of the class and all superclasses. Each virtual method table entry, or slot, consists of a pair of 32-bit words including a MethodBlk pointer (such as pointer 324) and a CSA pointer (such as pointer 326.) The MethodBlk pointer 324 locates a method block containing the opcode stream for the method and some additional data items that define the use of the method. MethodBlk pointers are found in a number of constructs, including, but not limited to, virtual method tables, ClassMethodRefs, stack marks, initialization data, trap tables, and interrupt tables. In most cases, a MethodBlk pointer is accompanied by a class CSA pointer.

The CSA pointer 326 locates the CSA (this class or one of its superclasses) for the method and thus locates an indexed CSA area (described below) for the method opcodes to use. A slot number is used to select a particular virtual method table entry. These slot numbers are typically specified in InstanceMethodRef entries in a CSA indexed area.

The indexed CSA area 306 contains references to data used by opcodes in methods of the class represented by the CSA. Each entry in the indexed CSA area 306 consumes either 32 or 64 bits; one word or two words, respectively. All entries are word aligned and the indices specify a word offset from the CSA pointer location. Indices of zero are not allowed, since the zeroth element of the indexed CSA area is not available. In the case of double word entries the index identifies the lowest addressed word of the two. The types of entries in the indexed CSA area include:

1. ClassRefs which identify a class by pointing to the CSA for that class. A ClassRef with a CSA pointer of "null" indicates that the ClassRef has not been resolved. In this case, as described below, the processor opcodes will trap to software to resolve the class reference and replace the null CSA ptr.
2. InstanceFieldRefs which provide byte offsets into objects for their fields. This field consists of a FieldOffset value, which, along with an objectref pointer, identifies the location in memory of the field. Due to the object header, FieldOffsets of zero through seven do not identify legal fields. So, a FieldOffset value of zero is used to determine that this InstanceFieldRef has not been resolved. In this case, the JEM opcodes will trap to software to resolve the field reference and replace the zero FieldOffset.
3. InstanceBitFieldRefs provide byte offsets into objects and contain a FieldOffset value and Size and Start bit fields. The FieldOffset field, along with the objectref pointer, identifies a location in memory of the field. The Start and Size fields identify which bits of that memory location to access. Due to the object header, FieldOffsets of zero through seven do not identify legal fields. So, a FieldOffset value of zero is used to determine that this Instance-BitFieldRef has not been resolved. In this case, the JEM opcodes will trap to software to resolve the field reference and replace the zero FieldOffset.
4. ClassFieldRefs provide addresses for class fields and consist of a FieldAddress field containing the actual physical byte address of the field in memory. Since no class field may reside at physical byte address zero, a null FieldAddress is used to signify that this ClassFieldRef has not been resolved. In this case, the JEM opcodes will trap to software to resolve the field address and replace the null FieldAddress.
5. ClassBitFieldRefs contain a FieldAddress field and bit fields Start and Size. The FieldAddress is the actual physical byte address of the field in memory. The Start and Size fields identify which bits of that memory location to access. Since no class field may reside at physical byte address zero, a null FieldAddress is used to signify that this ClassBitFieldRef has not been resolved. In this case, the JEM opcodes will trap to software to resolve the field address and replace the null FieldAddress.
6. InstanceMethodRefs provide a locator for the virtual methods of an object. The reference value includes a Slot# which identifies the entry in the object's CSA virtual method table. This entry has a MethodBlk pointer and CSA pointer for the method to be invoked. A second portion of the InstanceMethodRefs value identifies the number of 32-bit words, including the objectref, that are to be passed to the virtual method. Since virtual method table slot zero is not allowed, a Slot# of zero indicates that this InstanceMethodRef has not be resolved. In this case, the JEM opcodes will trap to software to resolve the slot number and number of argument and replace the entries in the InstanceMethodRef.
7. ClassMethodRefs provide a location for class methods for this and other classes and contain a MethodBlk pointer and a CSA pointer. The MethodBlk pointer provides the physical byte address of the method, and the CSA pointer indicates the CSA for the class of that method. A MethodBlk pointer of null indicates that the ClassMethodRef has not been resolved. In this case, the JEM opcodes will trap to software to resolve the ClassMethodRef and replace the MethodBik pointer and CSA pointer entries.
8. InterfaceMethodRefs provide a locator for an object's interface methods and contain an IntfID value and an ISlot# value. The IntfID value is a unique value identifying the interface to find. The object's Interfaces list has an Interface Method Table for this IntfID. The ISlot# value in the InterfaceMethodRef identifies an entry in that Interface Method Table. The identified entry is a slot number for the object's CSA virtual method table. This latter entry, in turn, has a MethodBlk pointer and CSA pointer for the method to be invoked. The use of zero for a valid interface ID is not allowed. Accordingly, an IntfID value of zero indicates that the InterfaceMethodRef has not been resolved. In this case, the appropriate instruction opcode will trap to software to resolve the InterfaceMethodRef and replace the IntfID and ISlot# entry values.
9. StringRefs provide a locator to a string from an entry of the class file CONSTANT_String_info, which entry is needed by code in one of the methods of this class. This string will have been stored with the other strings of the processor java/lang/String runtime.
10. SingleWordRefs provide 32-bit constant data from an entry in either the class file CONSTANT_Integer_info or the class file CONSTANT_Float_info.
11. DoubleWordRefs provide 64-bit constant data from an entry in either the class file CONSTANT_Long_info or the class file CONSTANT_Double_info.

Figure 4:
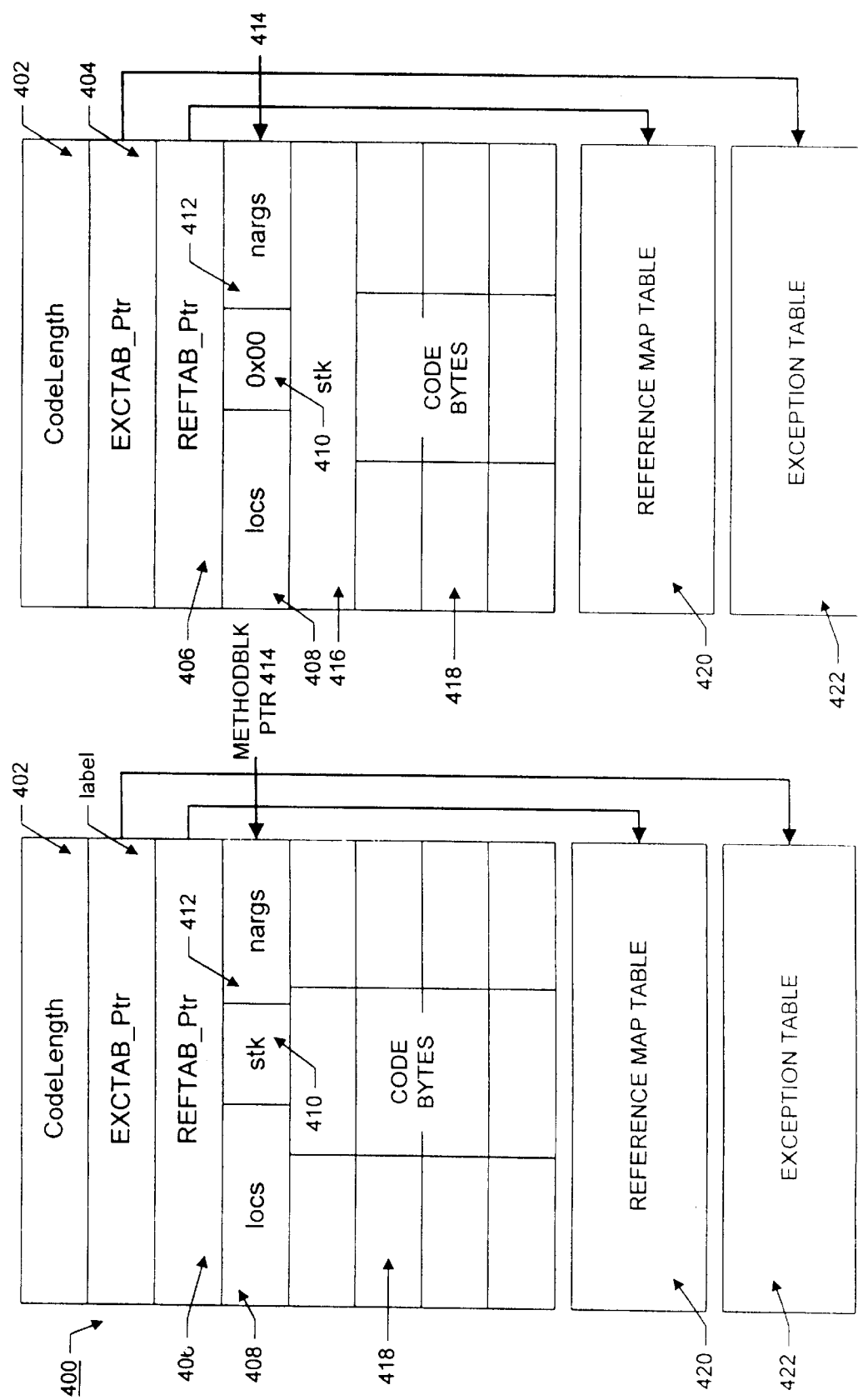
FIGS. 4A and 4B are schematic diagrams of method blocks for "small" and "large" stacks, respectively.

The CSA also contains method blocks which, as previously mentioned, include the opcodes for the methods used in the class. There are two types of method blocks: one for methods with "small" accumulator stacks and another for methods with "large" accumulator stacks. The method block which is used with small stacks (less than 256 words) is illustrated in FIG. 4A. The method block which is used with large stacks (more than 256 words) is illustrated in FIG. 4B. As illustrated in both figures, a method block 400 contains the following fields:

1. CodeLength field 402 which specifies the number of code bytes in method block 400;
2. EXCTAB_Ptr field 404 which contains a pointer to the Exception Table 422 (described below) for method block 400;

3. REFTAB_Ptr field 406 which contains a pointer to the Reference Map Table 420 (described below) for method block 400;
4. nargs field 412 which contains the number of 32-bit words passed to this method. The nargs field includes the objectref value for virtual methods;
5. stk field 410 (small stack method block) or 416 (large stack method block) which contains the maximum space (in 32-bit words) that this method needs for its stack mark and accumulator stack. stk equals 5+max_stack (specified in the class file).
6. locs field 408 contains the number of new 32-bit words that need to be allocated to the local environment when this method is invoked. These new words and those parameters pushed by the invoker make up the local environment for this method.
7. Code Bytes field 418 contains the stream of bytecodes for this method.

The Reference Map Table 420 for a method contains information identifying which elements in the accumulator stack are of type "reference". This information is available for garbage collection routines to correctly identify objects in use. Each entry in the table contains:
1. An unsigned 16-bit start program counter. Typically, this identifies the byte offset of the opcode that puts the reference on the stack.
2. An unsigned 16-bit end program counter. Typically, this identifies the byte offset of the last byte of the opcode that takes the reference off the stack.
3. An unsigned 32-bit accumulator stack offset count. This identifies the 32-bit word offset into the accumulator stack for the value that is a reference. The zeroth entry is the word closest to the stack mark.

All program counter offsets in the table are offsets from the start of the method code. A REFTAB_Ptr of null or a size of zero indicates that there are no reference values on the accumulator stack throughout this method.

The Exception Table 422 for a method contains information identifying exceptions that are handled by code in the associated method block, as well as information which assists exception handling routines to identify exception handlers when an exception occurs. Each entry in the table contains the following fields:
1. An unsigned 16-bit start program counter field which identifies the byte offset of the start of a range of opcodes for which the exception handler is valid;
2. An unsigned 16-bit end program counter field which identifies the byte offset of the last byte of opcodes for which the exception handler is valid;
3. An unsigned 16-bit exception handle field which identifies the byte offset of the first opcode of the exception handler;
4. An unsigned 16-bit exception index field which locates a ClassRef in the CSA Indexed Area that identifies the exception class.

All program counter offsets in the table are offsets from the start of the method code. An EXCTAB_Ptr 404 of null or of a zero size indicates that there are no exception handlers in this method block.

Figure 5:
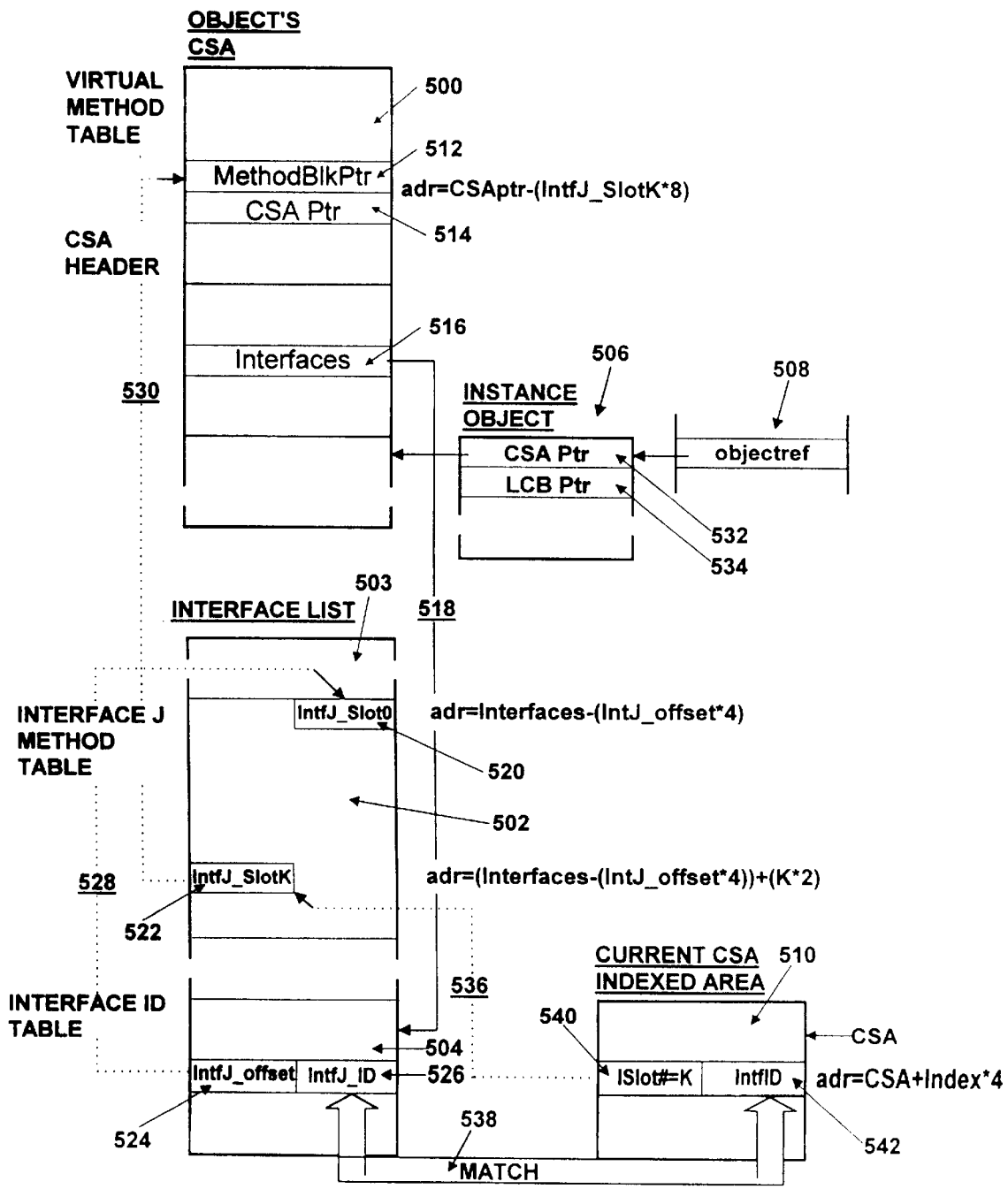
FIG. 5 is a block schematic diagram illustrating the relationship between virtual method tables, object CSA headers, interface method tables and interface ID tables.

The class interface list is a double-ended list structure containing an interface ID table and a set of interface method tables. The relation of the interface ID table and interface method tables with the CSA header and CSA indexed area is illustrated in FIG. 5. The interface ID table 502 is located by the Interfaces entry 516 in the CSA header 500 as indicated by arrow 518. Each entry in the interface ID table 504 identifies an interface implemented by the class represented by the CSA. If this class implements no interfaces, then the Interfaces pointer 516 in the CSA header 500 is null or the size of the interface ID table 504 is zero. The interface ID table 504 is created at the time the class and corresponding CSA are created.

The interface ID table 504 is an array of pairs of 16-bit entries of which one entry comprised of two parts, 524 and 526. For each interface J of the class, the corresponding entry has an interface ID value, designated as IntfJ_ID 526 and an interface method table offset value, designated as IntfJ_offset 524. Each of these values identify a unique interface implemented by the class. The IntfID value 542 in the InterfaceMethodRef entry in the indexed CSA area 510 (discussed above) is used as a key to select an entry with a corresponding IntfJ_ID value 526 in the interface ID table 504 as indicated by arrow 538. The value pairs in the Interface ID table 504 must be sorted in ascending order according to the IntfJ_IDs to accommodate binary searches performed by processor to select the entry. From the selected IntfJ_ID entry 526, the interface method table offset 524 identifies the interface method table 502 associated with this interface as indicated by arrow 528. The IntJ_offset value is an unsigned 16-bit value providing a word offset that is subtracted from the Interfaces pointer 516 to locate the beginning of table 502. An IntfJ_ID value and an IntfJ_offset value of zero signifies that the interface entry has not be resolved.

Interface method tables, such as table 502, are created either at the time the class is created or at a later time when the interface through this class is accessed. Therefore, there must be at least as many entries in the interface ID table 504 as there are interface method tables 502. When all Interfaces for this class have been resolved, there must be exactly the same number of entries in the interface ID table as there are interface method tables.

An interface method table, such as table 502 is an array of unsigned 16-bit virtual method slot numbers. There is one interface method table for each interface implemented by the class. An interface method table is selected through the interface ID table, as discussed above. The ISlot# value 540 from the InterfaceMethodRef value in the indexed CSA area 510 selects an entry in the selected interface method table 502 as shown by arrow 536 in FIG. 5. This entry contains a virtual method slot number, IntfJ_SlotK 522 identifying an entry in the virtual method table 500 for this class as shown by arrow 530. This entry contains the MethodBlk pointer 512 and CSA pointer 514 for the method requested.

Typically, when a method is invoked, a system's current status is stored, a new local environment is created, and then the execution of the invoked method begins. At the completion of the method's execution, the "new" environment is destroyed and the "old" environment is restored.

Although the performance penalty associated with such method invocation overhead may be acceptable in a non-real-time computing application, elimination of such overhead is critical to the success of a real-time JVM implementation. Consequently, in the illustrative JEM system, extended byte codes are substituted for selected JAVA method invocations. The extended byte codes, typically two-byte strings, not only reduce the length of selected Java instruction sequences, from three-to two-byte strings for example, they also eliminate the overhead involved with saving and restoring the system's's state, and, they directly execute the associated method in microcode, thereby yielding a significant acceleration of the method's invocation. Additionally, since the JEM's linker recognizes the selected invocations and inserts the extended byte codes, the JEM's JAVA compiler need not be modified.

The basic storage unit for JEM processor is the object. All objects exist on 32-bit word boundaries. There are two types of object data structures: object instances which contain a user-defined fields and are instances of the class "object", and arrays. Objects are located by an objectref or arrayref pointer and contain two parts: a header and a data area. All objectrefs and object pointers have a low-order address bit, A[1:0], set to zero. This places the object on a 32-bit word boundary. The object header contains an OBJ_CSA_Ptr pointer to the Class Static Area (CSA) which is described above. The object header also contains an OBJ_LCB_Ptr pointer to a Lock Control Block (LCB) for this object. When this pointer is null, there is no lock on this object. Lock Control Blocks are used to control access to the object and are discussed below.

Figure 6:
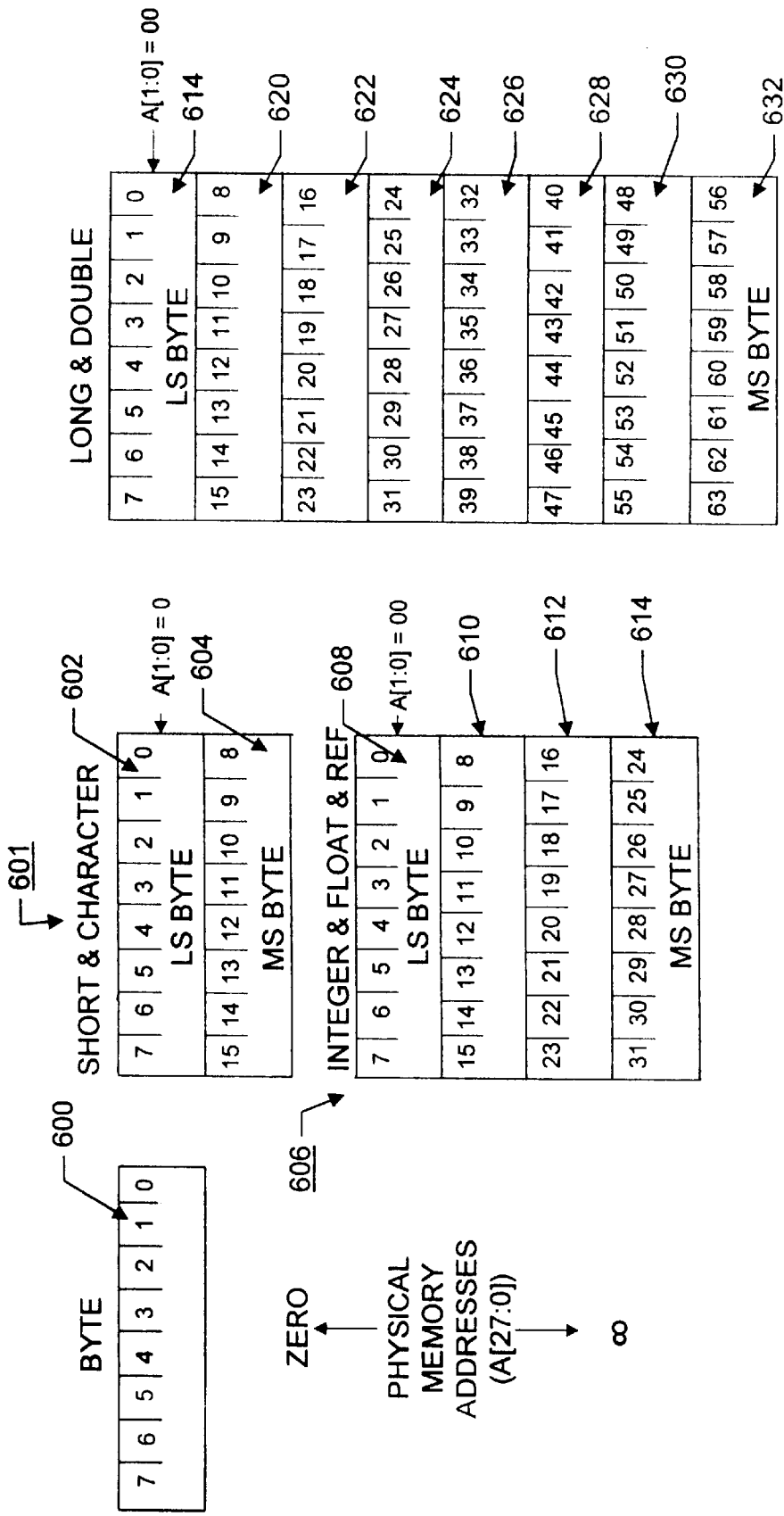
FIG. 6 is a schematic diagram showing storage requirements of various primitive data types used in the inventive system.

The JVM, and therefore JEM, supports data storage of 8-, 16-, 32-, and 64-bit fields in objects and arrays. JEM also supports 1-bit arrays. Bytes consume 8 bits, shorts and characters consume 16 bits, integers, floats, objectrefs and arrayrefs consume 32 bits, and longs and doubles consume 64 bits. FIG. 6 illustrates the binary memory storage requirements for the various data types that may be used in Java programs. In particular, FIG. 6 illustrates scalar data storage for an 8-bit system. The basic 8-bit byte 600 is shown in "little-endian" format. Since the JEM processor is a 32-bit machine, memory is organized logically as four single byte fields. Memory locations are accessed by a 28 bit address designed as A[27:0]. The least significant 2 address bits A[1:0] provide a two-bit code which selects one the 4 bytes in each 32-bit memory location to provide addressability at the byte level.

The primitive data types to be stored are character, short, integer, float, reference, long and double. The short and character types 601 are stored two to a word with the least significant (LS) byte 602 located at addresses A[1:0]=00 and A[1:0]=10 and the most significant (MS) byte 604 at addresses A[1:0]=01 and A[1:0]=11. The integer, float and reference data types 606 are stored one to a word consuming all four bytes 608–614 with the least LS byte 608 located at address A[1:0]=00 and the most significant byte 614 at address A[1:0]=11. The long and double data types 616 consume two words or eight bytes 618–632 with the LS byte 618 at address A[1:0]=00 and the MS byte 632 at address A[1:0]=11.

Figure 7:
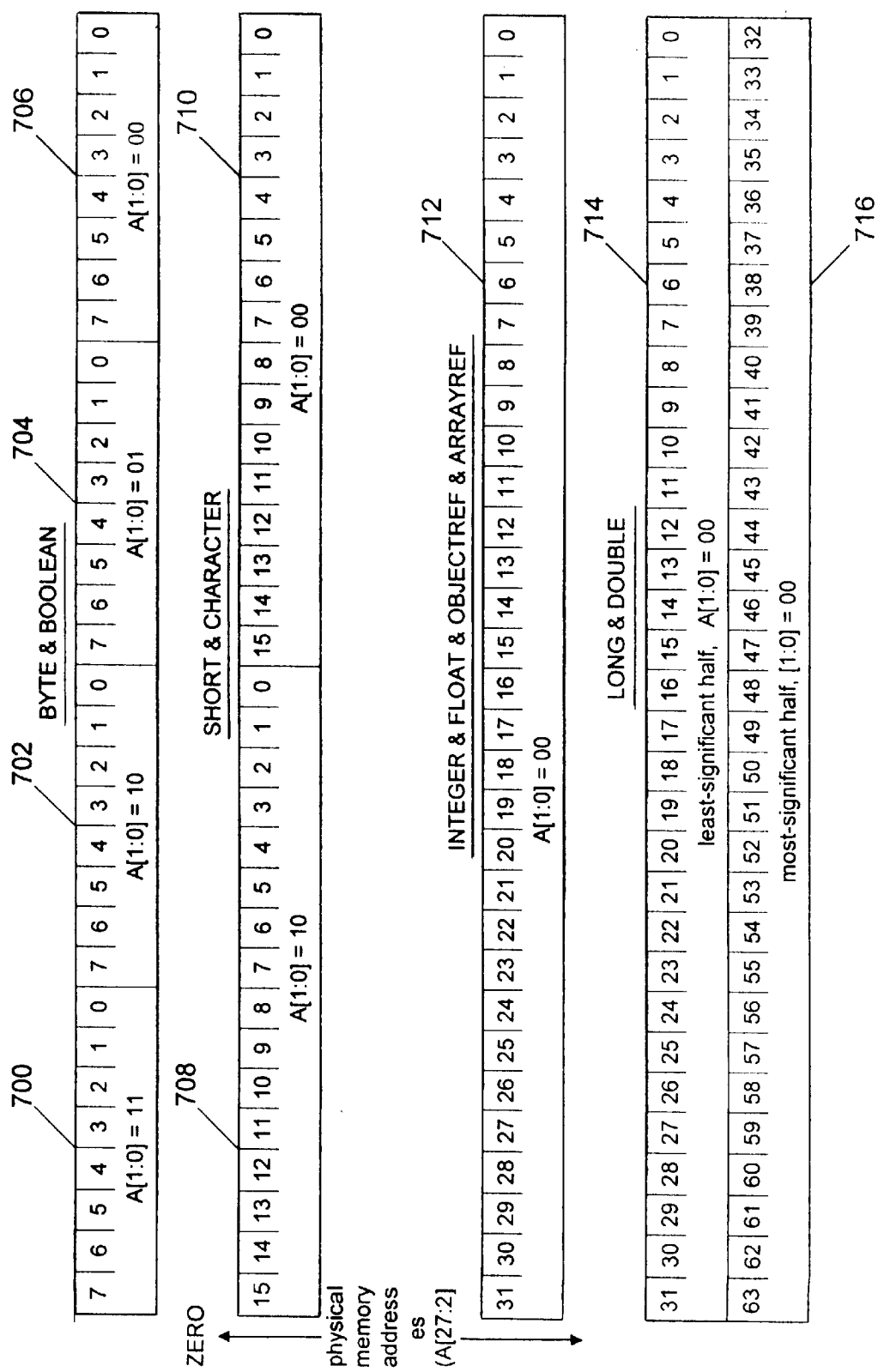
FIG. 7 is a schematic diagram illustrating how various data types are stored in the 32-bit words used in the inventive system.

The JEM processor imposes some limitations on the arrangement of data in memory. In particular, 16-bit data (short and character) must reside in the lower or upper half of the 32-bit word and 32- and 64-bit data (integer, float, reference, long, and double) must reside aligned on 32-bit word boundary. FIG. 7 illustrates the organization of data storage by type in 32-bit format. Four byte and boolean values 700–706 can be stored in one word, each starts at addresses A[1:0]=00, 01, 10 and 11, respectively. Two short and character values 708 and 710 are stored in each word at starting addresses A[1:0]=00 and 10, respectively. A single integer, float, objectref and arrayref value 712 is stored in each word at starting address A[1:0]=00. Finally the long and double values consume two words 714 and 716 with the least significant half at starting address A[1:0]=00 and the most significant half at starting address A[1:0]=00. Note that FIGS. 6 and 7 do not illustrate objects, but merely indicate the arrangement of data within objects.

Arrays are stored in little-endian zero-based format. The location of the elements in the array are restricted as specified above in connection with FIGS. 6 and 7. Arrays are objects and, as such, contain an object header along with a data area. The data area in arrays contain a 32-bit array_size followed by the array elements. The array_size has an integer type, but must not be negative. Arrays with elements less than 32 bits in size are packed and filled with zeros to fill out the last 32-bit word. Multidimensional arrays are configured as an array of arrayref pointers to a number of arrays, which may contain arrayref pointers to even more arrays.

User-defined objects created from a JVM class file contain a varying number of instance fields of varying types. As discussed above, these objects are stored in structures containing an object header and the data and are word-aligned. By definition, the data for these user-defined objects contains the fields for this class as well as all superclasses for this class. Only instance fields (not static) are stored in instance objects. The field list in the class file defines the format for the data in the object. Data is stored, and packed when possible, in the order that it is specified in the class file.

Figure 8:
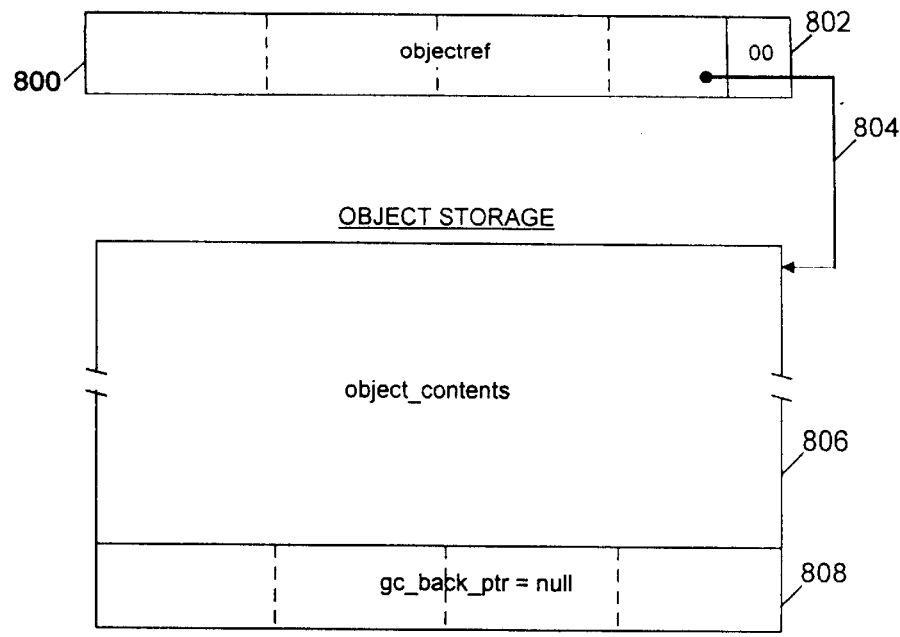
FIG. 8 schematically illustrates an object data storage format used in the inventive system to efficiently store JAVA object data.

As described earlier, the JVM specification requires automatic memory management in the form of garbage collection to assign and reclaim memory for program and data storage. While this mechanism is convenient and efficient for the application program developer, it is complex for the system developer. The symbolic representation of the object storage mechanism for objects is shown in FIG. 8. Objects which are not subject to garbage collection are identified by the presence of "00" in the D[1:0] bit positions 802 of the objectref reference field 800. The use of these latter bits 902 for garbage collection control is possible because the low two address bits are used for byte addressability, but objects are always word-aligned. The non-garbage-collected addressing method uses a single-referenced addressing with a single level of indirect addressing to point to the physical memory address 806 as indicated by arrow 804. This results in a generally simplified object access mechanism which requires less processing and hence offers greater speed. In the case of a non-garbage-collected object a back pointer 808 is set to null.

Figure 9:
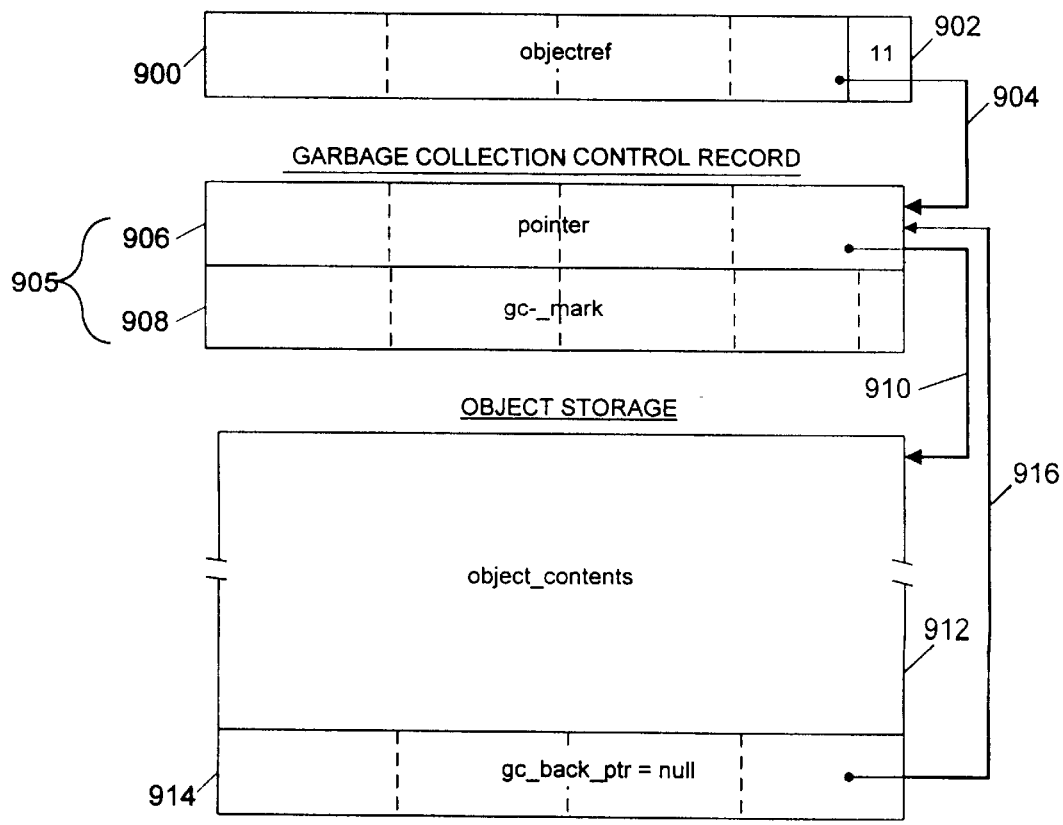
FIG. 9 schematically illustrates an object data storage format used in the inventive system to efficiently store JAVA object data when garbage collection is involved.

A symbolic representation of the object storage mechanism for garbage-collected objects is shown in FIG. 9. Several important characteristics of the garbage-collected object format should be pointed out. Garbage-collected objects are identified by the presence of "11" in the D[1:0] bit positions 902 (the garbage collection control bits) of the objectref reference field 900. The objectref field 900 contents point to a garbage collection control record 905 as indicated by arrow 904. The garbage collection control record 905 contains a pointer 906 which points to the actual object data address in memory 912 as indicated by arrow 910. The garbage collection control record 905 also has a field 908 to store a garbage collection flag, called gc_mark, which can be used to store an indication to the garbage collector program that the object is no longer in use and its storage may be reclaimed for subsequent use. The actual object data address in memory 912 also contains a back pointer 914, called gc_back_ptr which points to the garbage collection control record 905 as indicated by arrow 916. The format of the object itself is straightforward. This general storage accessing method is referred to as double-referenced addressing, whereby there are two levels of indirect addressing to point to an actual physical memory location.

The process of partitioning objects into garbage-collected and non-garbage-collected types involves design decisions that, like all object oriented designs, must be made with careful consideration of the nature of the problem and abstraction of the items into object representation. Non-garbage-collected objects must be considered with particular care, because by definition they exist forever in system memory. In general, non-garbage-collected objects will be ones that are associated with the low-level real-time aspects of the system. Examples of such objects might be display buffers, communication buffers, critical system-control objects, system configuration or parameter tables stored in non-volatile or other specialized memory devices or input and output interfaces to peripheral devices.

The most important characteristics of the non-garbage-collected object mechanism are that access to such objects is faster and more efficient than garbage-collected objects and access to the non-garbage-collected objects is never delayed by unavailability of the processor. To insure that access to non-garbage-collected objects, such as real-time control objects, is never delayed by the unavailability of the processor, garbage collection on garbage-collected objects may be interrupted by some real time event which is handled using non-garbage-collected objects as the processing and storage mechanism. No garbage collection takes place until the processing returns to garbage-collected objects. In this manner, access to real time control objects is never impeded by garbage collection.

Figure 10:
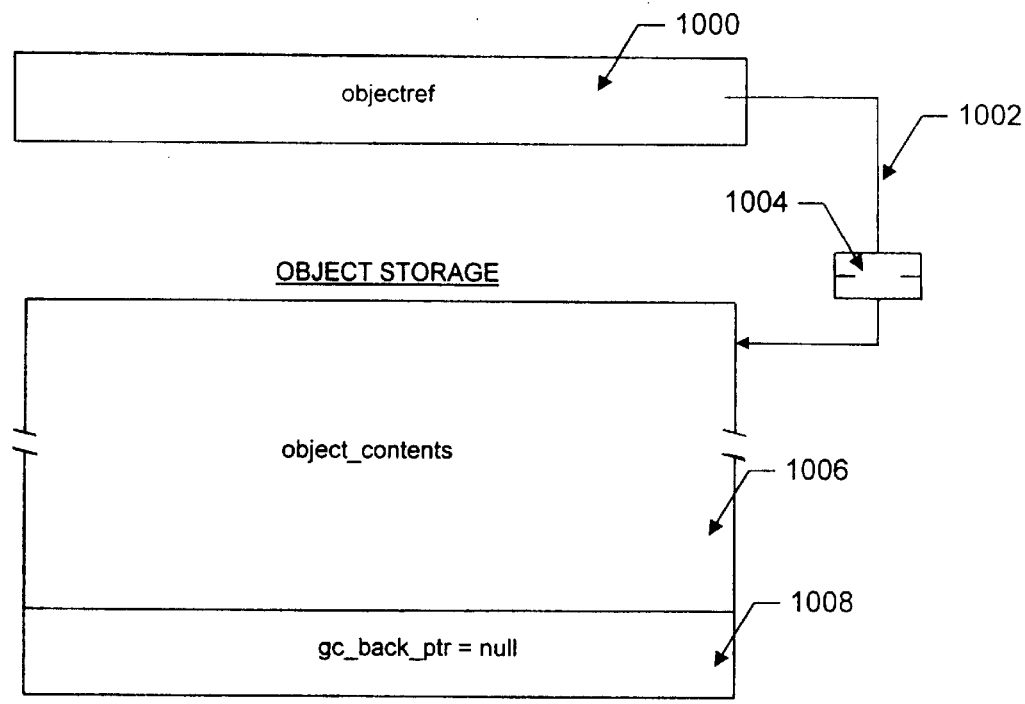
FIG. 10 illustrates a symbolic representation of object data storage for both garbage-collected and non-garbage-collected objects.

For purposes of illustration of the fact that objects may be referenced as either garbage-collected or non-garbage-collected type, an object referencing convention will be used as illustrated in FIG. 10. The reference from the objectref reference field 1000 includes in the arrow 1002 a small rectangular box 1004 which is symbolic of the garbage-collection control mechanism. If the object is of the garbage-collected type, the reference to the object is through the additional level of indirect addressing as illustrated in FIG. 9. If the object is of the non-garbage-collected type, the reference to the object is made directly from the object reference as illustrated in FIG. 8. The garbage collection control bits in the D[1:0] positions of the objectref field 1000 are not explicitly shown, but are also implied in the symbolic representation of the garbage collection control mechanism.

The net result of this dual object storage mechanism is a "best of both worlds" situation. The application program designer has the benefit of the use of a high-level object oriented design environment, while the real-time embedded system designer has the benefit of a predictable quickly responsive processor for control purposes. An additional benefit for the embedded system designer is the efficiency of a high-level programming environment. The design of the non-garbage-collected object format is directly compatible with the garbage-collected format, so all of the normal Java facilities are available.

A real-time JEM embodiment illustratively accommodates garbage collection by dividing its operation between a time-critical, executive, mode of operation and an ancillary, user mode, of operation. A real-time kernel operates exclusively on static data structures, i.e. permanent data structures supported by the JVM specification which will not be subject to garbage collection. The real-time kernel executes time critical functions and will be entered upon JEM reset, in response to system-servicing interrupts, and in response to kernel-specific events, such as system ticks or watchdog timeouts. Because the kernel operates exclusively on static data structures, structures with no need for garbage collection, the kernel may provide the determinacy that is a hallmark a real-time operation, in part, by eliminating all garbage collection during its operation.

Additionally, should a time critical operation need servicing during a user mode operation, the user mode routine is interrupted and the operation is switched to the executive mode. Elements of the thread control block, i.e. PC 1506, CSA 1508, VARS 1510, MARK 1512, QOS 1514, and JVMPtr 1518, are automatically saved in order to preserve the system's data when switching to executive mode. The thread control block and its constituent elements will be discussed in greater detail in relation to FIG. 15. The system state is automatically restored upon completion of the time critical tasks and return to user mode operation. Additionally, should the switch from user mode to executive mode have taken place during garbage collection, garbage collection may resume from the point at which it was interrupted. That is, since executive mode operation is restricted to static data structures, a switch to executive mode does not effect the integrity of a garbage collection operation which may have been underway. Applications which operate on top of the kernel in executive mode would have separate heap allocations and no need for garbage collection.

By definition, embedded real time computer systems must respond to inputs and create outputs in time critical circumstances. The ability to receive an input, process information relevant to that input and generate an output in real time is obviously dependent on the speed of the processor system. The speed of the processor system is determined by physical hardware electrical and architectural characteristics and by software architectural characteristics. The hardware characteristics of a processor system are generally dictated by physical fabrication parameters, and in general are a function of cost: faster costs more. The software architectural characteristics of a processor system are subject to cost/performance economies as well, however the economies of software are generally governed by different parameters that are driven by software methodology. This may be illustrated by comparing two different software solutions to a given problem, one solution created using a low level assembly language program and the other solution created using a high level programming language. An example problem might be an engine control system which receives a parameter indicating the desired speed of the engine and has an input to indicate the measured present engine speed and an output to control the position of the throttle of the engine. A flowchart of the simple speed control is shown in FIG. 11.

This control task starts in step 1100 and proceeds to step 1102 where the desired speed is input. Next, in step 1104, the present speed is measured. In step 1106, a determination is made whether the present speed is less than the desired speed. If so, the routine proceeds to step 1110 where the throttle is increased. If not, the routine proceeds to step 1108 where the throttle is decreased. In either case the routine proceeds back to step 1104, where the present speed is measured again. Operation proceeds in this manner indefinitely.

Figure 11:
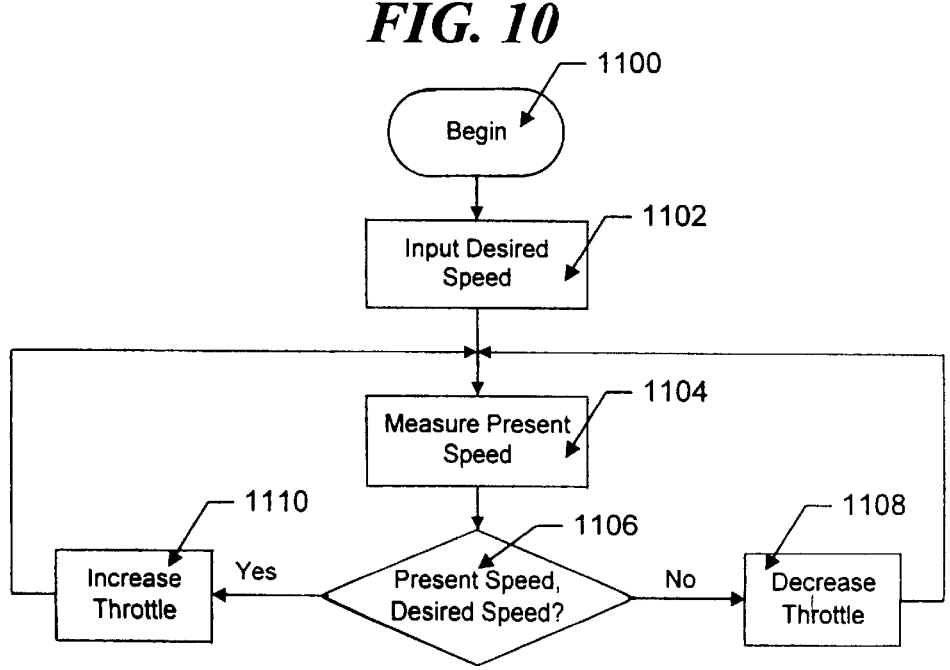
FIG. 11 is a flowchart illustrating the steps in an illustrative speed control routine.

A variety of well known programming methods might be used to create a program to perform the control task as described in the flowchart of FIG. 11. A program written in a low level assembly language might require several dozen instructions to implement the described function. A program written in a higher level language might require only a few instructions. While the given example is nearly trivial, it serves to illustrate the fact that the efficiency of software design may be significantly impacted by the characteristics of the design tools and environment.

The balancing consideration for design efficiency is performance, which is an indication of processing efficiency. In general, there is overhead and resulting loss of processing efficiency associated with the use of high level languages. Many processing tasks are not particularly speed critical, so relatively low processing performance is acceptable for such tasks. Real time embedded applications generally have a number of critical tasks for which processing speed is the essential consideration. For a high level language such as Java to be useful in such applications, the processing efficiency must be high.

High level languages depend heavily on symbolic referencing of information, whereby an item is referenced by name, for purposes of efficiency and flexibility. It is possible for the system programmer or team of several programmers using such an environment to design a large program referencing many objects without spending any effort managing memory allocations, storage assignments or similarly tedious tasks that are often associated with programming, especially in real time embedded systems. Changes to the system program may be made without fear of affecting the inter-operation of various program modules since the object referencing method is central and organized. For actual program execution, however, it is necessary to reference the object logically, whereby the item is referenced by physical location. There are a number of ways that the symbolic to logical referencing conversion may be completed.

A well known symbolic to logical reference resolution method is to create an index much like the index of a book that has an ordered list of elements associated with an address of that element, i.e., a page number in the case of a book, or a memory address in the case of a computer system. The primary disadvantage of this reference resolution method is its speed inefficiency. Like the index of a book, the list must be searched to find the item of interest and retrieve its location information. If the index must be searched each time an item is to be accessed, a significant amount of time and effort must be expended for this address resolution process.

A more efficient symbolic to logical reference resolution mechanism is to use an index similar to the previously cited example, but each time the index is searched to access an item, the results (logical address) are saved for future reference. There are a number of methods that may be used to capture the symbolic to logical resolution information for future reference. One such method is taught by Gosling in U.S. Pat. No. 5,367,685, which is hereby incorporated by reference and is referenced by Sun Microsystems, Inc., in the "The Java Virtual Machine Specification" at page 389. In the method taught by Gosling, a sequence of instructions is executed until a symbolic reference to an object is encountered. When this occurs, the symbolic reference is resolved using an index retrieval method to identify the logical address of the item, and then the instruction sequence is modified to substitute a different instruction along with the logical address of the item that the instruction will reference. This resolution mechanism is performed only the first time a symbolic reference to an item is encountered. All subsequent execution of the instruction sequence then uses the modified instruction sequence, with logical address references included, so no further index accessing is required.

The present invention teaches an improved symbolic to logical reference resolution method that performs the function of converting symbolic references into logical addresses without changing instructions or reference information in the instruction sequence. Instead, the resolution information is included with the object itself, so any other procedures that might access the object gain the speed advantage of the symbolic to logical resolution that has been performed on the object by the first procedure to reference that object. A further benefit of the present invention is that no modification of the sequence of program instructions is needed, so this sequence could be stored in lower cost read-only memory (ROM) if desired. Also, since the program sequence is unchanged, checksum methods can be used to insure the integrity of the read-only memory contents for enhanced system reliability.

As described earlier, it is common for a program created using a high level language to consist of multiple portions or objects. Each of these objects may be accessed by a multitude of other portions of the program. It is common for a large program to be constructed by assembling sections of the program from multiple sources to build the complete configuration. Often, there are variations of the program for different applications that include different portions of the program from a master library for particular requirements. Because of the likelihood that the final configuration of a program may change from one application to another, it is desirable that the management of the various component parts of the program be as flexible as possible.

Traditionally, programs that consist of multiple sections have required the component sections to be specifically identified, processed and linked together to form a single program entity which is then further processed and loaded into the memory of the processor upon which the program will be executed. This process of linkage editing requires that all of the program components be gathered together at one time, which can be inconvenient when the program components are developed in pieces, as is often the case. If a change is made to any component, the entire process must be repeated.

The object of the present invention is to simplify the process of creating programs consisting of a multitude of smaller programs and objects. The key to the invention is a mechanism by which symbolic references to objects are converted into the logical references required by the processor and subsequently stored with the object for future use.

Figure 12:
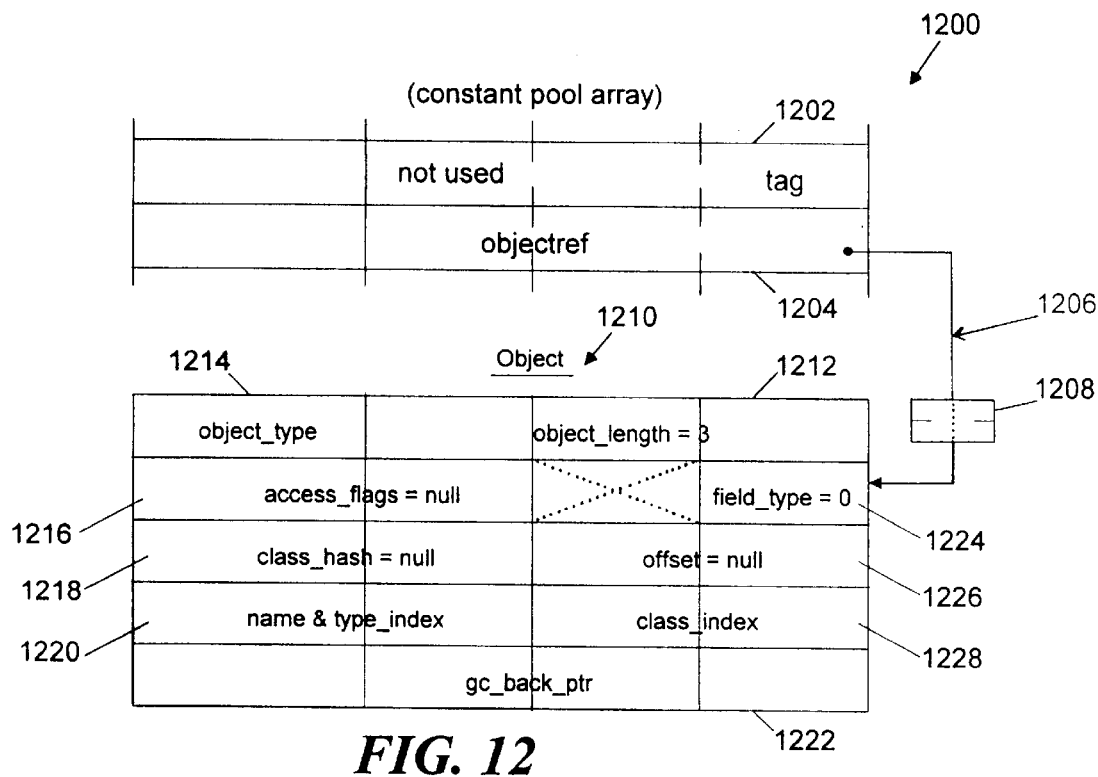
FIG. 12 is a schematic diagram of an object in which the symbolic references have not been resolved.

FIG. 12 illustrates an example object 1210 after creation of the object but before any reference to the object has been attempted. The "box" symbol 1208 in the arrow 1206 pointing from the objectref reference field 1204 in the constant pool array 1200 is used to illustrate the earlier described garbage-collection/non-garbage-collection control mechanism. When objects are created by the compiler, references are symbolic (by name) and are identified by entries in the aforementioned constant pool array 1200. A tag value 1202 identifies a constant pool entry type which identifies the record format to the system.

Figure 13:
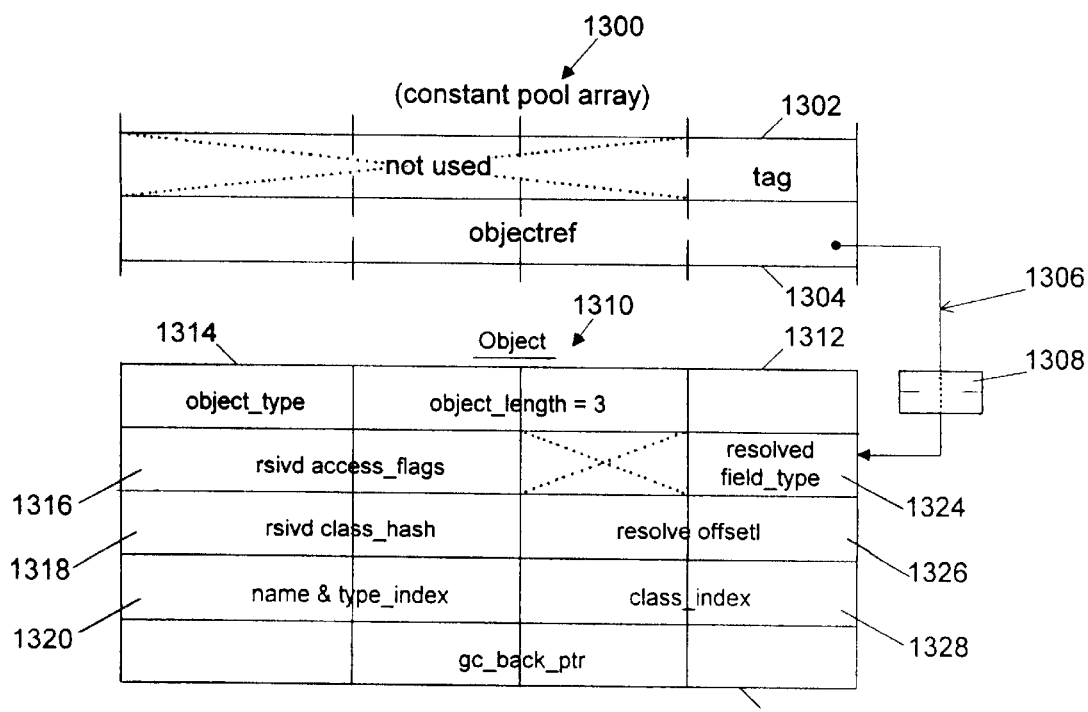
FIG. 13 is a schematic diagram of an object in which the symbolic references have been resolved.

The object 1210 includes various fields including object_type 1214, object_length 1212 and field_type 1224 The field_type value 1224 will be 0 since the field references are still unresolved and exist only in symbolic form. The object 1210 also includes access_flags 1216, a class_hash value 1218, a name&type_index field 1220, the back pointer gc_back_ptr 1222 an offset 1226 and a class_index 1228. Many of these latter fields will also be null because the references have not been resolved. Upon first access to the object, the instruction execution procedure will examine the field_type and, upon determining that the field reference is unresolved, immediately perform the symbolic to logical addressing resolution function. This procedure consists of referencing the constant pool array 1200 to find the symbolic reference to the object 1210, looking up the logical address of the object 1210, using that information to create the resolved access information to be stored with the object, (a particular case of which is illustrated in the example of FIG. 13, wherein fields which are equivalent to fields in FIG. 12 have equivalent numbers), and changing the field_type value 1324 to the type corresponding to the object. Other field values, such as the access_flags 1316, class_hash 1318, and offset 1324 fields are also changed to reflect the resolved status. Subsequent accesses to the object will examine the field_type value 1324 and determine that the references to the object have been resolved (as well as being able to identify the object type).

The resolved field_type value 1324 replaces the initial value or 0 that is stored in this field by the compiler to indicate that the object references within the object are symbolic and must be resolved before access to such objects is possible. The resolved access_flags field 1316 contains access control information that is associated with the object to implement security functions. The resolved offset and resolved class-hash fields, 1326 and 1318, respectively, implement the logical object addressing function using the resolved class-hash field 1318 as the base address and resolved offset field 1326 as an index from the base address. It is important that the present simple example is used for illustration purposes only and that in general, objects may take a multitude of different forms with large and varied information fields and further references to other objects.

In general, the instruction stream associated with a method invocation will contain a symbolic address, expressed as an index to a method block pointer located within the current indexed CSA for the method to be invoked. If the method block pointer is null, the class method has not been resolved and, in a first attempt to invoke the method, the current class CSA and the index, i.e., the symbolic address, are used on the stack and passed as parameters to a method which automatically resolves the symbolic address. Upon return from resolution routine, the process will return to the original method invocation, which may now proceed, as symbolic address has been resolved to a binary address by "filling in" the method block pointer and method block. In future invocations of the method, the index within the instruction stream will point to the method block pointer, which will then point to the method's method block. In this manner, a symbolic address only needs to be resolved upon the first invocation of a method. Additionally, since the instruction sequence is not modified by the resolution process, i.e., the index in the instruction string will still point to the method block pointer, the instruction may be located in ROM. As noted above, the ability to house instructions within ROM provides cost savings, increased reliability, and certification advantages for real-time, embedded systems.

Synchronization is performed in the JVM by means of locking statements. The JAVA synchronized statement computes a reference to an object and then attempts to perform a lock operation on that object. A JAVA program executing the statement does not proceed further until the lock operation has successfully completed. After the lock operation has been successfully performed, the body of the synchronized statement is executed. When execution of the statement body is completed, either normally or abnormally, an unlock operation is automatically performed to release the lock.

A JAVA synchronized method automatically performs a lock operation when it is invoked and, as with the synchronized statement, the method body is not executed until the lock operation has successfully completed. If the method is an instance method, it controls a lock associated with the instance for which it was invoked. If the method is static, it operates with a lock associated with the class object that represents the class in which the method is defined. When execution of the method body is completed, either normally or abnormally, an unlock operation is automatically performed to release the lock.

The aforementioned JAVA synchronization is directly supported by JEM data structures. All instance objects as well as class objects have a "lock control block pointer" (LCB_Ptr) entry. This pointer locates a lock control block which identifies the state of a lock on that object. Lock control blocks are only needed for those objects which are locked at some time during their existence. For those objects that are never locked, the LCB_Ptr is null.

Locks are needed for instance and class objects in three configurations. A synchronized instance method has a lock control block that is located by an LCB_Ptr in the instance object. A synchronized class method has a lock control block that is located by an LCB_Ptr in the class object. A synchronized instance has a lock control block that is located by an LCB_Ptr in the instance object.

Figure 14:
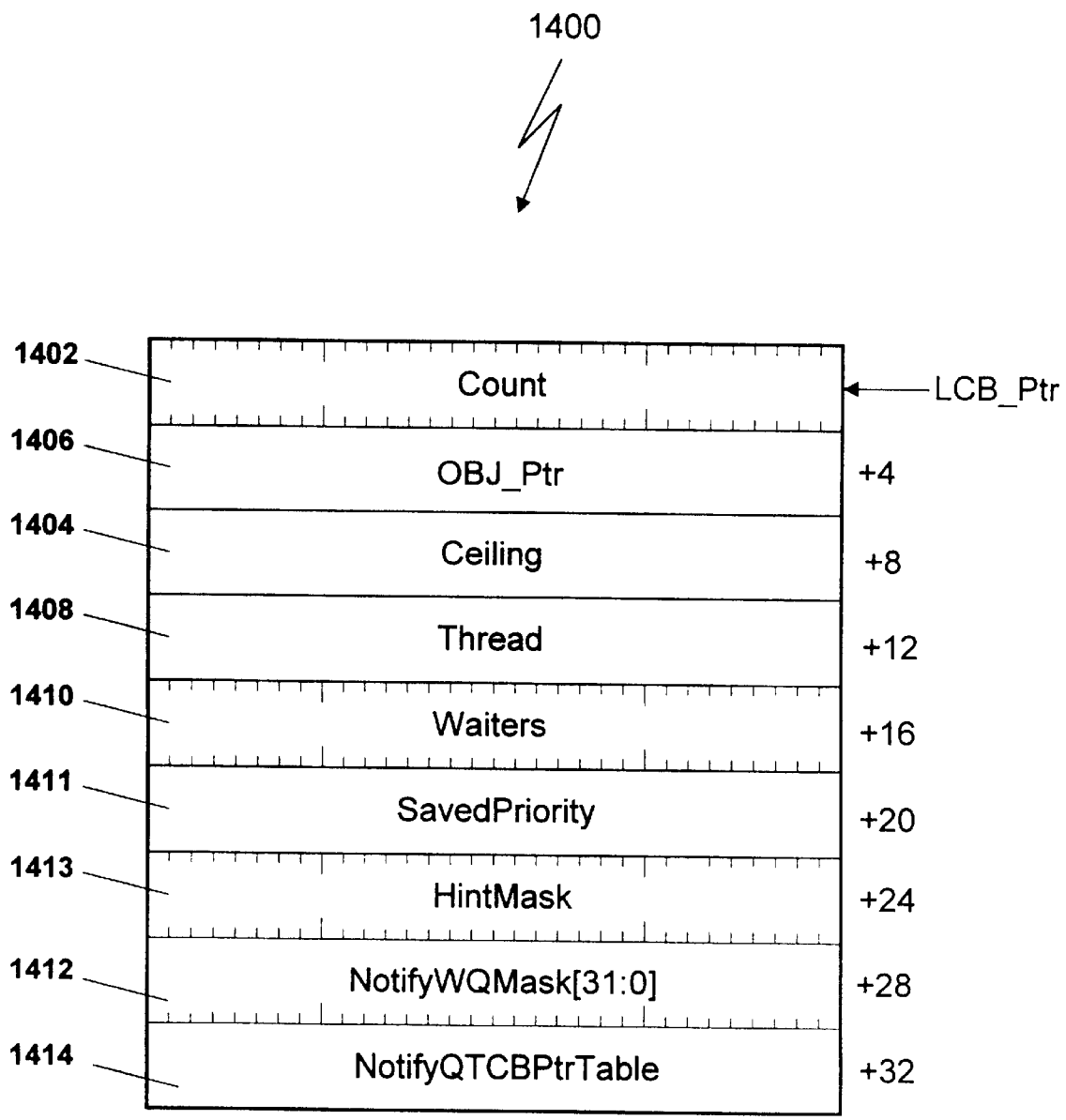
FIG. 14 is a schematic diagram of a lock control block showing the contents thereof.

As shown in FIG. 14, data in the lock control block 1400 defines the state of the lock on an object, which data consists of eight entries:

1. The "count field" 1402 is a 15-bit value that indicates the number of times the object has been locked. A count of zero indicates that the object is unlocked. A count of one indicates that the object has been locked once. Counts of more than one may occur if a thread relocks an object which it currently has locked.
2. The "W field" 1404 is a one-bit flag that indicates if there are any waiters for this lock. When the count value is non-zero, W=1 indicates that there are waiters for this lock; W=0 indicates that there are no waiters. When unlocked (count value=0), W is zero.
3. The OBJ_Ptr field 1406 holds a 32-bit pointer to the object that this lock control block controls.
4. The "thread field" 1408 holds a 32-bit pointer to the thread control block (discussed below) for the thread that owns this lock. When the corresponding object is unlocked (count value=0), the thread pointer is null.
5. The "waiters field" 1410 holds a 32-bit pointer that locates a linked list of threads waiting for this lock. When the waiters flag is not set (W=0), the waiters field holds a null pointer.
6. The "NotifyWQMask field" 1412 is a field having 32 one-bit flags indicating which entries in the NotifyQTCB table have at least one thread control block in their queue.
7. The "NotifyQTCBPtrTable field" 1414 holds a 32-bit pointer to a prioritized table of queues of thread control blocks for threads waiting for a notify.
8. NotifyAllHintMask 1416 is 32 one-bit flags indicating which entries in the NotifyQTCB table have more than thread control block in their queue.

The first five entries, 1402–1410, are used for lock control. The last three, 1412–1416, are used to identify threads in queues for wait/notify operation.

When an object is created it has a null LCB_Ptr. At the first need for synchronization, a lock control block is allocated from memory. If a lock control block is successfully allocated, the LCB count field is incremented, indicating the object is locked and pointers to the object and the current thread control block are added. Unlocking for each synchronization request after the first is simply performed by decrementing the lock count field and setting the thread pointer field to null.

The JEM processor can operate in one of two operating modes: executive mode and user mode. When operating in executive mode, the processor performs supervisory and privileged operations. When operating in user mode, the processor executes applications and applets. During executive mode operation, any active user threads are suspended. During user mode operation, the executive thread is not active and is waiting to be initialized by an interrupt or user request. Thread control and context switching between executive mode and user mode is based on thread control blocks (TCBs). Each thread control block defines the state of a suspended user thread to allow multi-threaded operation on single-threaded CPU hardware. Both the executive and user modes employ thread control blocks to control thread sequencing.

Figure 15:
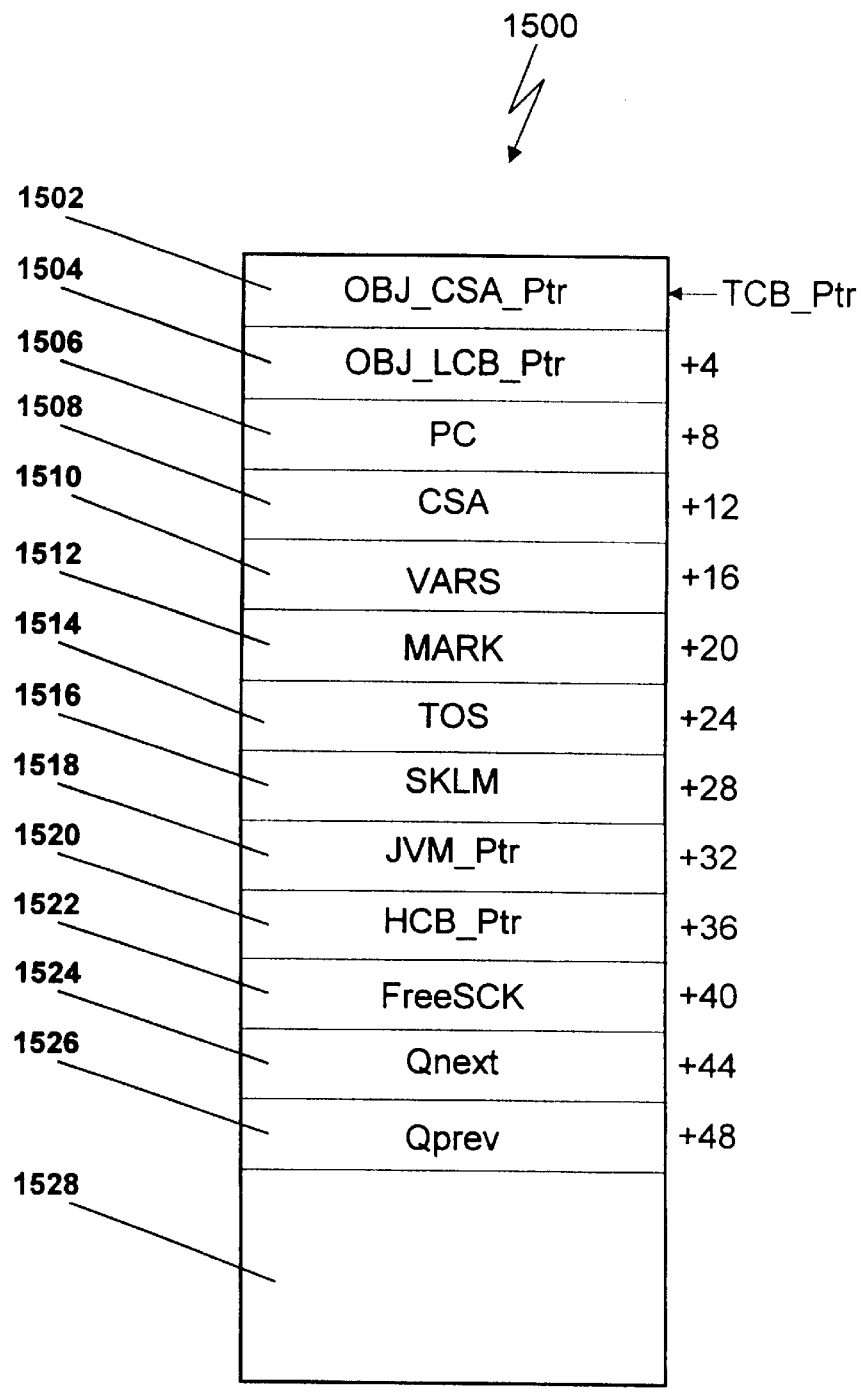
FIG. 15 is a schematic diagram of a thread control block showing the contents thereof.

FIG. 15 shows the contents of a TCB 1500 needed for microcoded context switching. TCBs are constructed to look like a JAVA object so that the fields can be easily manipulated by the existing JAVA software. The TCB fields include the usual OBJ_CSA_Ptr and OBJ_LCB_Ptr fields, 1502 and 1504, respectively, which point to the CSA area and lock control blocks and also include the following fields:

1. PC field 1506 which is a 32-bit field that saves the program counter of a suspended thread or contains the MethodBIk pointer for a thread's main method prior to initialization of the thread.
2. The CSA field 1508 which is a 32-bit field that saves the class CSA pointer of a suspended thread or contains the CSA pointer for the class of a thread's main method prior to initialization of the thread.
3. The VARS field 1510 which is a 32-bit field that saves the pointer to the current local environment of a suspended thread. This field is null prior to thread initialization.
4. The MARK field 1512 which is a 32-bit field that saves the pointer to the current stack mark of a suspended thread. This field is null prior to thread initialization.
5. The TOS field 1514 which is a 32-bit field that saves the current top-of-stack pointer of a thread.
6. The SKLM field 1516 which is a 32-bit field that saves the current stack limit pointer of a thread.
7. The JVM_Ptr field 1518 which is a 32-bit field that contains a pointer which locates a JVM Control Block for the JVM that this thread executes in.
8. The HCB_Ptr field 1520 which is a 32-bit field that contains a pointer which locates a heap control block for this thread.
9. The Free SCK field 1522 which is a 32-bit field which contains a pointer that locates a linked list of free stack chunks. This field is null for an empty list of SCKs.
10. The Qnext field 1524 which is a 32-bit field containing a pointer that locates the next thread control block in a circular thread queue or in a lock waiters list.
11. The Qprev field 1526 which is a 32-bit field containing a pointer that locates the previous thread control block in a circular thread queue. Qprev is null when the thread control block is in a lock waiters list. Qprev and Qnext provide a doubly linked, forward and backward, structure.
12. Additional space 1528 is available for thread scheduling software.

TCBs contain the processor state for a user thread when that thread is suspended or not yet initialized. Most of the processor state for the currently active thread is held in CPU registers. During a context switch, the processor state in the CPU registers is transferred to the appropriate TCB or the processor state in the new TCB is transferred to the CPU registers.

Figure 16:
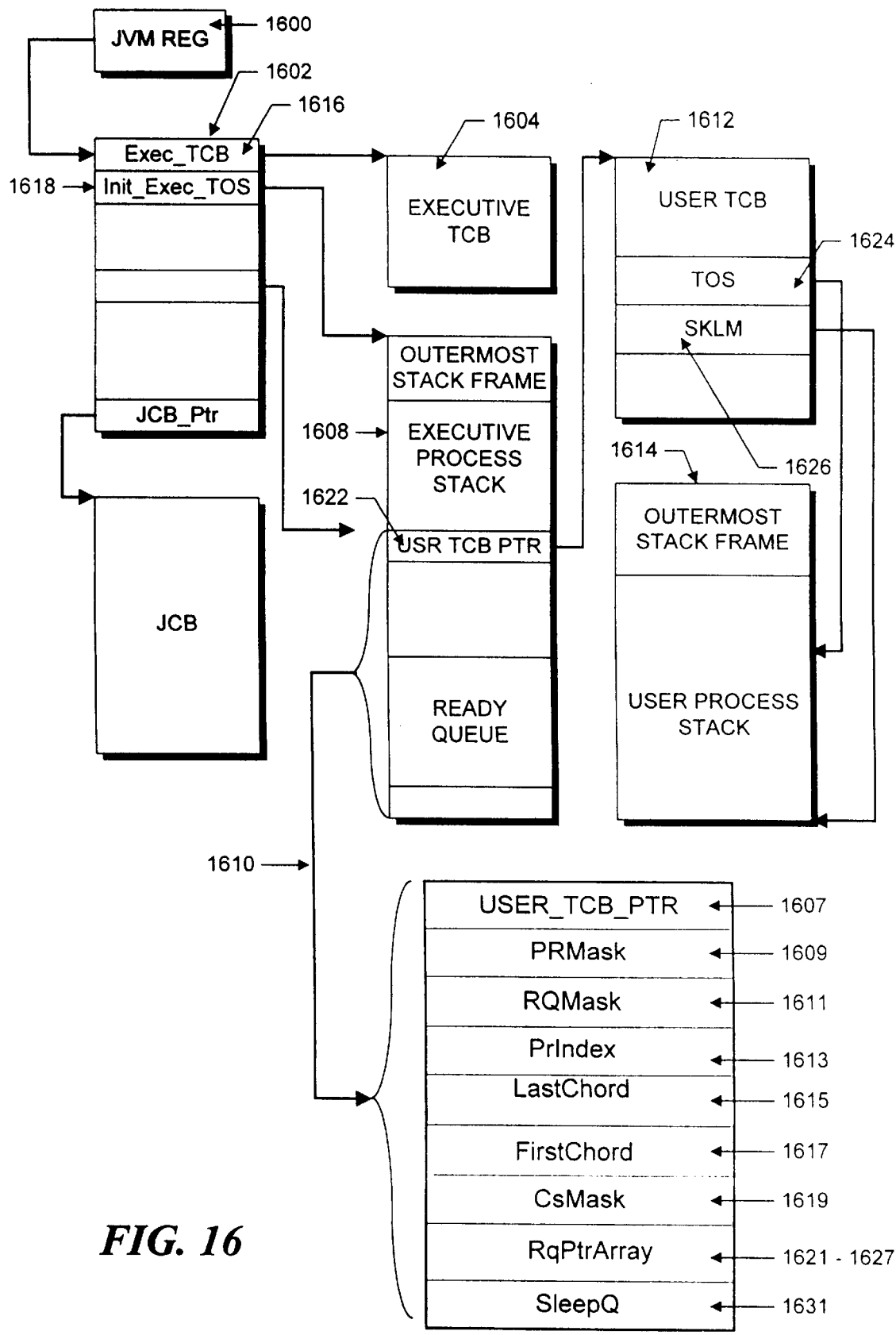
FIG. 16 is a block diagram of a JVM execution environment.

The collection of data structures used to manage a given Java Virtual Machine is referred to as a "logical execution environment" and is illustrated in the block diagram of FIG. 16. These data structures may be further subdivided into "executive mode" and "user mode" logical environments. The executive entry table (EET) 1602 which serves as the root data structure for a JVM and contains pointers to the other relevant control structures. A JVM register 1600 in the processor register file (204) contains the address of the EET 1602 for the active JVM. Each JVM also has its own set of EET handlers. Each JVM has an executive thread control block 1604 and an executive process stack 1608. The executive control block 1604 is located by a pointer, Exec_TCB 1616 in the EET 1602. The executive stack 1608 is located by the Exec_TOS pointer 1618 in the EET 1602. The EET 1602 also contains pointers to various interrupt, RESET and ABORT handlers. A pointer 1620, JCB_Ptr, to the JVM control block (JCB) 1606 is also included. The JCB includes event flags, validity and error information.

A JVM also has a thread management control block or executive control block (ECB) 1610 which is used during context switches as described above. The ECB is located in the executive process stack 1608 directly above the User TCB pointer 1622 which is at the Exec_TOS pointer 1618 location in the EET 1602.

The User TCB pointer 1622 points to the User TCB 1612 which is also used during context switches as discussed above. The User TCB contains a pointer 1624 (TOS) which points to the top of the User process stack 1614 and another pointer 1626 (SKLM) which points to the end of the User process stack 1614.

In accordance with the principles of the invention, all of the control structures are located by the value in the JVM register 1600. Therefore, during a context switch, a new set of control structures can be made active simply by changing the value in the JVM register 1600. The same microcode and code sequences can be used for processing in each JVM by referencing the JVM register 1600 to obtain the "root" address for the correct control structures for that JVM.

The executive entry table (EET) is the "root" data structure for a JVM logical environment, and is identified via the JEM's JVM register. The EET resides at memory location 0000. Since the JEM architecture clears the JVM register on reset, it becomes, "clear and forget" kind of situation.

JEM's "executive" execution mode is a supervisory mode intended for kernel operating system functions, interrupt handling, and trap handling. Only one executive mode thread of control may be active at a time. For example, if an interrupt occurs, an interrupt handler thread of control is created. This interrupt thread must then complete before executive mode is exited.

The logical JEM executive execution environment includes the executive entry table (EET), JVM control block (JCB), the executive thread control block (ETCB), an the thread manager control block (TMCB).

Thread Manager Control Block (TMCB) or executive control block (ECB)

Certain control structures necessary to manage threads are static and apply to an entire JVM. For example, the list of JVM threads eligible to run is maintained in a ready queue data structure. Since the JEM microcode directly manipulates the ready queue and other threading control structures, it needs some way to find them.

The thread management control block provides this mechanism. It maintains global thread management data in memory locations accessible via the INIT_EXEC_SKLM field of the EET. The executive control block, or thread management control block (TMCB) is used for context switching of an executive mode thread. This control block is called an executive control block (ECB) and is illustrated in FIG. 16. Executive control blocks are also constructed to look like a JAVA object to allow easy manipulation of the fields by software. The Executive Control Block is located by the overloaded INIT_EXEC_SKLM pointer and participates in scheduling of periodic threads. The thread scheduling mechanism is a "piano roll" mechanism which is discussed in detail below. In accordance with the piano roll mechanism, each piano roll comprises a plurality of "chords" that are "played" in a fixed order which repeats. Each chord comprises a predetermined set of threads which are executed together. Threads are executed or "played" in accordance with their position in a ready queue which maintains a list of JVM threads eligible to run. The JEM microcode directly manipulates the ready queue and other threading control structures, in a manner determined by a predetermined priority scheme. The ECB fields shown include fields which facilitate this piano roll and priority mechanism. These fields include:

1. USER_TCB_PTR 1607 which is a 32-bit pointer which locates the currently-active user Thread Control Block.
2. RqMask field 1609 which is a bit mask that identifies occupied ready queue priority levels. It aids rapid lookup of the highest priority ready thread.
3. PrMask field 1611 is a bit mask which masks out empty periodic priority queues in the ready queue. The PrMask bit mask field is normally equal to the RqMask bit mask field. However, if all threads at a periodic priority level should become blocked, the PrMask bit corresponding to that level is cleared. The PrMask field can be logically ANDed with a field representing a piano roll chord. If this logical operation is performed before the chord is ORed with the RqMask field, it prevents turning on empty periodic priority levels. The piano roll operation is described in detail below.
4. PRIndex field 1613 is a pointer to the current piano roll chord.
5. LastChord field 1615 is a pointer which points to the last chord in the piano roll.
6. FirstChord field 1617 is a pointer which points to the first chord in the piano roll.
7. CsMask field 1619 is a bit mask which identifies periodic priority levels that have experienced one or more instances of "cycle slip" as described below.
8. an RqPtrArray comprised of fields Rq0Ptr 1625 through Rq32Ptr 1627 is used as the "ready queue". It is organized as an array of doubly-linked TCB lists, where each array element corresponds to a priority level. The individual lists are known as "priority queues".
9. SleepQ field 1629 is a pointer to a doubly-linked list of thread control blocks for threads delayed due to certain thread operations such as joins, waits, and sleeps.
10. Additional space 1631 is available for thread scheduling software.

Ready Queue Management

In a multithreaded system, the decision concerning which thread to run at any particular moment is made in accordance with a scheduling mechanism. In the illustrative embodiment, the JEM employs a preemptive, priority-based scheduling policy. Such a scheduling mechanism is particularly suited to a real-time embedded system, such as may be employed within an avionics system. Generally, threads are dispatched (i.e., scheduled to run) in accordance with the following rules:

1. The currently executing thread is always the highest priority runnable thread.
2. If a blocked higher priority thread becomes runnable during the execution of a lower priority thread, the lower priority thread is preempted and the higher priority thread executed.
3. Equal priority threads are dispatched in round-robin order.

A priority-based scheduler dispatches (make ready to execute) the highest priority thread from the set of all runnable, or "ready", threads. In a real-time embedded system, this choice should be made quickly. Therefore, the data structure, referred to hereinafter as the "ready queue", used to represent all ready threads should facilitate fast lookup of the highest priority thread.

Threads themselves are represented by thread control blocks (TCBs), as previously described. A thread is placed "in" the ready queue by placing the thread's TCB in the ready queue.

Although a number of data structures could be employed as the ready queue, the illustrative ready queue is based on an array of linked lists of differing priorities. The array provides for rapid queue insertion an deletion and for thread dispatch prioritization. Each priority level has a doubly linked list of thread control blocks, with each linked list referred to as a priority queue. There is a global variable for each list and the variables reside in a pointer array. Given a thread's priority, queue insertion is constant time, since the priority may be used as an index into the pointer array.

Bit Mask Priority Marker

The ready queue also employs:

1. A bit array that maps directly to the linked list pointer array.
2. Processor ISA support for finding the first set bit (i.e., counting the leading zeros) in the bit array.

The bit array (henceforth called a "mask") is sized so that there is a one-to-one mapping from each bit to each entry in the pointer array; e.g., a 16-word pointer array requires a 16-bit mask. If a pointer array entry in null—meaning that priority level is empty—the corresponding bit in the mask is 0. Conversely, the mask bit for an occupied priority level is 1.

A leading zero count performed on the mask will yield the array index of the "first" occupied priority level. If we map priorities into the pointer array so that the highest priority level resides at array index 0, the leading (i.e., starting at the MSB of the mask and assuming each pointer is 4 bytes long) zero count identifies the highest priority queue, as follows:

$$ADDRdisp=ADDRptarray+4*CLZ(BIT\_MASK)$$

where ADDRdisp=Byte address of first non-null pointer arrayf entry, the "dispatch" priority queue ADDRptrarray=Base byte address of pointer array With the bit mask/pointer array approach, the following operations are constant-time and fast:

1. Dispatch of highest priority ready thread.
2. Queue insertion before/after head.
3. Queue head deletion.
4. Queue insertion after tail.
5. Queue "head-becomes-tail" rotation.

Yet two more data structure adjustments.

1. Use doubly-linked list for the priority queues. (Add back-link field.)
2. Have pointer array entries point to the priority queue heads instead of tails. provide the following benefits:
   1. All queue deletions are constant-time.
   2. A level of indirection is removed form the dispatch algorithm.

Use of CLZ vs. count "trailing" zeros produces the following inverse relationship between the leading zero count and priority:

$$LZC+Priority=CONSTANT$$

where CONSTANT=the number of priority levels—1= number of bit mask bits-1.

Note also that:
LZC=Pointer Array Index (in general)
Bit #=Priority

JEM Ready Queue

Figure 17:
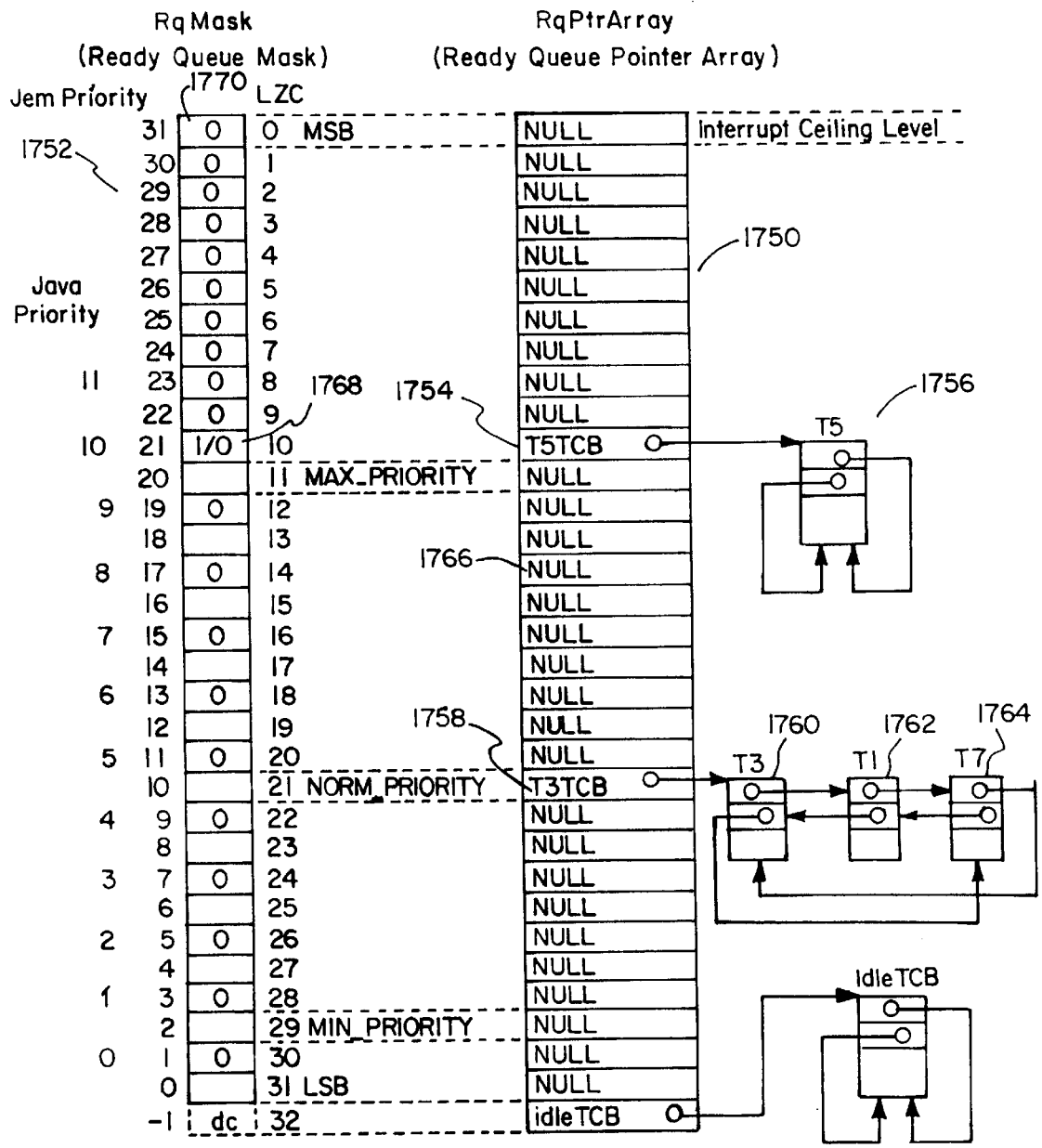
FIG. 17 is a block diagram of JEM ready Queue.

The illustrative JEM ready queue of FIG. 17 is a 32 priority level bit mask/pointer array. RqPtrArray is the pointer array and RqMask is the bit mask. (A 32-level queue was chosen because the JEM word size is 32 bits.) In the inventive JEM processor, a priority-based scheduler which conforms to the above-described rules dispatches (makes ready to execute) the highest priority thread from the set of all runnable, or "ready", threads. In a real-time embedded system, this choice should be made quickly, so the data structure used to represent all ready threads should facilitate fast lookup of the highest priority thread. A data structure called a "ready" queue is used to store ready threads. The threads in the ready queue are represented by thread control blocks. A thread is "in" the ready queue if the ready queue contains that thread's TCB. The ready queue implemented with fields 1724–1726 is a 32 priority level queue which uses a bit mask (field 1708) to speed thread dispatch.

As shown in FIG. 17, the ready queue consists of the RqPtrArray 1750. In the ready queue 1750, each active priority level has its own doubly-linked list of TCBs, and a global variable is used to represent each list. For example, JEM priority level 21 contains a pointer T5TCB (1754) which points to a linked list starting with TCB T5(1756). In this list there is only a single member 1756. Similarly, priority level 10 contains a pointer T3TCB (1758) which points to a TCB list containing three linked TCBs 1760, 1762 and 1764. The individual linked lists are known as "priority queues" and the global variables (1754, 1758) reside in the ready queue 1750 which is effectively a pointer array. There are 32 JEM priority levels, running from 0 to 31. Empty priority levels, such as level 1766, have null pointers in the corresponding array entries. Queue insertion is accomplished in constant time, since the thread priority may be used as an index into the pointer array. Thread dispatch requires a linear search through the pointer array which is facilitated by the bit mask field 1752. The bit mask 1752 maps directly to the linked list pointer array with one bit for each level. The highest occupied priority level can be located by finding the first set bit (i.e., counting the leading zeros) in the bit mask 1752. As shown in FIG. 17, this level 1768 corresponds to priority level 21.

The bit mask 1752 is sized so that there is a one-to-one mapping from each bit to each entry in the pointer array. Priorities are mapped into the pointer array so that the highest priority level resides at array index 0 and the leading (starting at the MSB of the mask 1752) zero count identifies the highest priority queue. With the bit mask/pointer array approach, the many queue manipulation operations are constant-time and fast, including dispatch of highest priority ready thread, queue insertion before/after the queue head, queue head deletion, queue insertion after the queue tail, queue "head-becomes-tail" rotations and queue deletions.

JAVA priority ranges is defined by two constants: MIN_PRIORITY and MAX_PRIORITY found in the shared JAVA class, classjava.lang.Thread. The current values of these constant are 1 and 10, respectively. A further constant called NORM_PRIORITY (=5) defines the default thread priority. In accordance with the JAVA specification, an applet's priority cannot exceed NORM_PRIORITY+1. JAVA priorities 1 to 10 are mapped to priority levels 2, 4, 6, 8, 10, 12, 14, 16, 18, and 20 in the JEM processor. This mapping is performed by multiplying the JAVA priority by a further constant called the JEM.Configuration.priorityMultiplier(=2). This mapping allows two JEM priority levels to be associated with each JAVA priority level: one level for periodic threads and one level for non-periodic threads.

JEM priorities 3, 5, 7, 9, 11, 13, 15, 17, 19, and 21 are reserved for periodic threads controlled by the piano roll mechanism as described below. Each "periodic" priority level is one higher than its corresponding aperiodic level, thus giving dispatch preference to cyclic threads. Priority level 31 (1770) is reserved for the "interrupt" priority ceiling level. This priority is used to create uninterruptible JEM user mode critical sections so that object locks may be shared between executive and user modes. The remaining priority levels, 0, 1, and 22–30, are reserved for JAVA daemon threads.

A context switch involving an executive mode thread takes place as follows. At reset, the processor is put in executive mode and an automatic call to the reset method is performed. There is no TCB used at this point, since no processing has been performed prior to reset. This reset method is considered the "outer" executive method at this point. The reset method continues execution until a return instruction is reached in this outer executive method. Since there is nowhere to return to, this outer method return is used in the JEM processor to activate a user thread. The outer method return leaves the executive stack empty as it was at reset.

The user thread to be activated is defined by a TCB that has been created by the executive reset method software. The user thread is initialized and execution begins with the first instruction of its "outer" method. The user thread continues execution until one of four events occurs: 1) an interrupt occurs that requires executive intervention, 2) a software TRAP instruction occurs that requires executive intervention, 3) an built-in trap occurs requiring executive intervention, or 4) a return instruction is executed in the user thread outer method. When one of these events occurs, the current state of the user thread is saved in the user TCB and a context switch is made to the executive method identified to handle the event.

Executive activation at this point is much like that of reset. An automatic call is made to the executive method identified and execution commences with the first instruction in that method. Execution continues until this outer executive method's return at which time a user task is activated. The user task that is activated may be the continuation of the one previously described or may be the initiation of a new user task all of which is up to the executive software controlling user TCBs.

JEM Priority Assignments

The Java priority range is given by constant MIN_PRIORITY and MAX_PRIORITY in classjava.lang.Thread. Their current assignments are 1 and 10, respectively. Constant NORM_PRIORITY (=5) defines the default thread priority. An applet's priority shall not exceed NORM_PRIORITY+1.

Java priorities 1 to 10 map to "JEM" priorities 2, 4, 6, 8, 10, 12, 14, 16, 18, and 20. This mapping is performed using constant JEM.Configuration.priorityMultiplier(=2), as follows:

JEM priority=(java.lang.Thread.priority*priorityMultiplier)+priorityoffset

Constant priorityoffset is 0 and provides flexibility.

JEM priorities 3, 5, 7, 9, 11, 13, 15, 17, 19, and 21 are reserved for periodic threads controlled by the JEM piano roll discussed in relation to Figure. Each "periodic" priority level is one higher than its aperiodic cousin, thus giving dispatch preference to cyclic threads.

Periodic thread priority assignments are performed using constant JEM.Configuration.periodicPriorityOffset(=1), as follows:

JEM priority=Oava.lang.Thread.priority*priorityMultiplier)+periodicPriorityOffset Priority level 31 is reserved for the "interrupt" priority ceiling level. This priority is used to create uninterruptible JEM user mode critical sections so that object locks may be shared between executive and user modes. The remaining priority levels, 0, 1, and 22–30, are reserved for daemon threads.

The executive uses a "piano roll" mechanism to process periodic or "cyclic" threads. The piano roll is a list of entries called "chords" which are periodically replayed in a fixed order. The piano roll is driven by a periodic interrupt called a "tick" which is usually generated by a hardware timer. Each piano roll entry is a one-word, bit-mapped chord wherein each bit corresponds to a thread. Bits which are set indicate which threads should be made ready when the chord is "played."

Making a periodic thread ready consists of removing if from the delay queue and inserting it into the ready queue. This is a fairly expensive operation, especially if performed for high-rate threads. The situation is further aggravated by periodic threads that become simultaneously active. For example, 5, 10, and 20 Hz threads become simultaneously active at a 4 Hz rate (The 10 and 20 Hz threads coincide at a 10 Hz rate). Although overall throughput is not affected, simultaneous periodic thread activation increases the system's interrupt latency.

By offsetting the periodic threads start times, it is possible to reduce and sometimes eliminate simultaneous activation. However, offset implementation is error prone, difficult to test, and confusing to use. In the illustrative embodiment, the JEM processor employs the bit mask approach discussed in relation to FIGS. 16 and 17 to ready periodic threads in parallel.

If a 16-bit word, the PT MASK, were ORed with the BIT MASK, any set bits in PT MASK would set, in parallel, the corresponding bits in BIT MASK. This is the general approach employed to enable several priority queues at once. However, consider what happens when we naively try this. ORing PT Mask with BIT MASK may enable the priority levels associated with BIT MASK bits that have a priority level of 0. However, based on the bit mask usage rule, a priority level associated with a 0 bit should be empty, and it makes no sense to enable an empty priority level.

To overcome this problem, the usage rule is modified to state that periodic priority levels are always occupied, but may be disabled by clearing the associated BIT MASK bit. The intent of the original rule was to ensure that the dispatching microcode recognized occupied priority levels and ignored empty ones, so the new rule allows us to temporarily bypass occupied periodic priority levels, which is precisely the desired effect. In other words, a periodic thread must not run until it's time to do so.

In the illustrative embodiment of the JEM processor, certain priority levels in the ready queue are designated as periodic-thread-only. These periodic-thread-only levels may be activated in parallel by ORing a PT MASK with the ready queue BIT MASK.

Consider now the following two questions:

1. Given that a periodic priority queue is activated by setting the appropriate ready queue BIT MASK bit, when and how is that bit cleared?

2. What makes priority queue activation periodic?

To answer the first question, consider the model for a periodic thread's run method given as follows:

```
public void run() {
    <setup processing, if any, goes here>;
    for (;;) {
        <periodic processing goes here>;
        this.cycle();
    }
}
```

Periodic processing is performed as part of an endless loop. When periodic processing is complete, a call to runtime method cycle ( ) blocks the thread by clearing its bit in the ready queue mask. Once removed from the ready queue, the periodic thread remains blocked until the PT MASK once again sets the thread's ready queue BIT MASK bit.

Making priority queue activation involves performing the following operation:

BIT MASK<- BIT MASK OR PT MASK, as part of a periodic tick interrupt handler.

We now have a way to periodically activate several priority levels in parallel. However, since there is only one PT MASK, all these priority queues must be activated at the same rate. For example, if operation

BIT MASK<- MIT MASK OR PT MASK, is performed in a 20 Hz tick interrupt handler, all priority queues controlled by PTMASK will activate at a 20 Hz rate. By adding just one more PTMASK, say, PT MASK2, and alternating its use with PTMASK, we can control priority queues at two different rates. For example, using the following method, the priority queues controlled by PT_MASK are activated at a 20 Hz rate; those controlled by PT_MASK_2 activate every other time the tick interrupt occurs, i.e., at a 10 Hz rate.

```
public void tickHandler20Hz() {
    count++
    BIT—MASK = BIT—MASK | PT—MASK;
    if(count%2 == 0) BIT_MASK = BIT—MASK | PT—MASK—2;
```

However, if more than two periodic rates are needed, the following adjustments may be made:

1. Create a new PT MASK 2 by merging PT MASK into PT MASK 2.

2. Place the two resulting masks into an array.

3. Have the tick interrupt handler read the masks form the array in a round-robin fashion.

PTMASK is merged into PTMASK2 by ORing the two masks. This creates a new PTMASK2 that contains all the set bits from the original PTMASK and PTMASK2. This allows one OR operation to be used in place of the two OR operations that occur every other tick in the method just discussed.

Additionally to address adjustment #2, assume that the old PTMASK=$0000\_0080_{16}$ and the old PTMASK2= $0000\_0008_{16}$. The result of merging the two masks and placing them into an array is illustrated below

|              | 31        | 7   | 3     | 0              |
|--------------|-----------|-----|-------|----------------|
| Array indices| 0 000...1 | 0 0 0 | 0 0 0 0 | PT MASK      |
|              | 1 000...1 | 0 0 0 | 1 0 0 0 | "New" PTMASK2 |

ORing PTMASK into the ready queue BITMASK will activate priority level 7 and ORing the new PTMASK2 into BITMASK will activate priority levels 7 and 3.

For adjustment #3, the tick interrupt handler may be rewritten so that it cycles through the array, as follows:

```
public void tickHandler20Hz() {
    BIT—MASK = BIT—MASK |
         PT—MASK—ARRAY [count++]; //count
initialized to 0.
         if (count == 2) count = 0;
}
```

When the first tick occurs, count =0 and the mask at array index 0, PTMASK, is ORed into the ready queue BITMASK. This activates priority level 7. Count is also incremented to 1. On the second tick, the mask at array index 1, PTMASK2, is ORed into BITMASK, turning on both priority levels 7 and 3. Count is reset to 0. The third tick, with count=0, starts over at the beginning of the array and ORs PTMASK with BITMASK. And so on. The net effect is that priority level 7 becomes ready at a 20 Hz rate and priority level 3 runs at half that rate (=10 Hz).

If the mask array were wrapped around a cylinder, and holes punched where there are 1s, the result would be similar to a piano roll. Since the holes in a piano roll control which piano keys are depressed, one could say that reading a mask form the mask array is like playing a chord (i.e., scanning a row of holes) from a piano roll. This above analogy forms the basis for calling the periodic mask array a "piano roll" and the individual masks "chords".

Tick frequency is chosen based on the highest rate periodic thread; e.g., a 20 Hz thread needs a 10 Hz tick. However, if the slowest rate periodic thread frequency is not evenly divisible into all other periodic thread frequencies, the tick frequency will have to be greater than the highest rate thread, which results in a throughput penalty. (Unless, of course, there is some other activity that has to be done at this higher tick rate.) For this reason, periodic thread frequencies are typically chose as multiples of one another. It is similarly advantageous to have the delay resolution be equal to the period of the highest rate periodic thread.

The piano roll tick rate is given by:

$$\text{Tick\_Rate} = \text{LCM}_{rate}$$

where $\text{LCM}_{rate}$=Least common multiple for the set of all periodic thread rates. For example, for periodic threads running at 50, 25, and 10 Hz, the tick is:

$$\text{LCM}(50,25,10)=50 \text{ Hz}.$$

For periodic threads running at 30 and 20 Hz, the tick rate is $$\text{LCM}(30,20)=60 \text{ Hz}.$$

The number of chords in a piano roll is determined by the following formula:

$$N_{chord-Tick}\text{\_Rate}/\text{GCD}_{rate}$$

where $N_{chord}$=Number of piano roll chords $\text{GCD}_{rate}$= Greatest common divisor for the set of all periodic thread rates For example, given a tick rate=50 Hz and periodic threads running at 50, 25, and 10 Hz, the number of chords is 50/GCD(50, 25, 10)=50/5=10 chords. Given a tick rate =50 Hz and periodic threads running at 50 and 25 Hz, the number of chords is 50/GCD(50, 25)=50/25 =2 chords. Given a tick rate=50 Hz and (a) periodic thread(s) running at 50 Hz, the number of chords is 50/GCD(50)=50/50=1 chord. Given a tick rate=50 Hz and periodic threads running at 50 and 1 Hz, the number of chords is 50/GCD(50, 1)=50/1=50 chords. Given a tick rate=60 Hz and periodic threads running at 30 and 20 Hz, the number of chords is 60/GCD(30, 20)=60/10=6 chords.

The inventions described in this disclosure represent significant improvements to the art of computer system design for application to real time embedded systems. The described inventions have particular application to the implementation of a system that is designed and programmed in a high level object oriented language such as the Java programming language.

The description above should not be construed as limiting the scope of the invention, but as merely providing an illustration to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A computer system comprising:
   (a) a compiler for compiling a high level source code to generate an intermediate code; and
   (b) a microprocessor system for executing said intermediate code, said microprocessor system comprising a microprocessor and an instruction set so that said microprocessor system is capable of executing said intermediate code as the native code of the microprocessor without a software interpreter;
   wherein said intermediate code is characterized in that it does not require a direct knowledge of the microprocessor environment;
   wherein said intermediate code comprises a real time embedded program.

2. The computer system according to claim 1 wherein said intermediate code retains at least some symbolic references of its corresponding source code.

3. The computer system according to claim 1 wherein said source code is selected from the group consisting of the source codes of C, C+, C++ and Java.

4. The computer system according to claim 1 wherein said source code is selected from the group consisting of the source codes of C, C+ and C++.

5. The computer system according to claim 1 wherein said microprocessor employs stack-oriented addressing.

6. The computer system according to claim 5 wherein a plurality of different microcoded instruction sets may be employed without substantially altering the fundamental architecture of the computer system.

7. The computer system according to claim 5 wherein the microprocessor is a Rockwell Advanced Architecture MicroProcessor with at least 16 bit addressing.

8. The computer system according to claim 1 wherein said intermediate code uses primarily symbolic references to stored information.

9. The computer system of claim 1 wherein said intermediate code comprises a transportation application.

10. The computer system of claim 9 wherein the computer system is embedded in avionic equipment.

11. A computer system comprising:
(a) a compiler for compiling a high level source code to generate an intermediate code; and
(b) a microprocessor system for executing said intermediate code, said microprocessor system comprising a microprocessor and an instruction set so that said microprocessor system capable of executing said intermediate code as the native code of the microprocessor without a software interpreter;
wherein said intermediate code is characterized in that it does not require a direct knowledge of the microprocessor environment; and
wherein said intermediate code retains at least some of the symbolic characteristics of its corresponding source code.

12. A computer system comprising:
(a) a compiler for compiling a high level source code to generate an intermediate code;
(b) a microprocessor system for executing said intermediate code, said microprocessor system comprising a microprocessor and an instruction set so that said microprocessor system is capable of executing said intermediate code as the native code of the microprocessor without a software interpreter;
wherein said intermediate code is characterized in that it does not require a direct knowledge of the microprocessor environment, wherein said compiler is capable of generating Java bytecodes and wherein said source code is selected from the group consisting of the source codes of C, C+ and C++.

13. A computer system comprising:
(a) a compiler for compiling a high level source code to generate an intermediate code; and
(b) a microprocessor system for executing said intermediate code, said microprocessor system comprising a microprocessor and an instruction set so that said microprocessor system capable of executing said intermediate code as the native code of the microprocessor without a software interpreter;
wherein said intermediate code is characterized in that it does not require a direct knowledge of the microprocessor environment; and
wherein said intermediate code uses primarily symbolic references to stored information.

14. The method according to claim 11 wherein no modification of said sequence of instructions is made.

15. The method according to claim 12 wherein said sequence of instructions are stored in read-only memory.

16. The method according to claim 13 wherein said time critical computer program comprises a real time embedded program.

17. The method according to claim 16 wherein said intermediate comprises a real time embedded program.

18. A computer system comprising
(a) a first memory wherein intermediate level instructions are stored;
(b) a second memory wherein native level instructions are stored; and
(c) circuitry for selecting a set of native level instructions to execute in response to each intermediate level instruction without a software interpreter; and
wherein the intermediate level instructions retain at least some of the symbolic characteristics of their source code.

19. The computer system of claim 18, wherein the intermediate level instructions primarily use symbolic references to store information.

20. The computer system claim 17, wherein the intermediate level instructions primarily use symbolic references to stored information.

21. The computer system of claim 17, wherein a microprocessor employing stack-oriented addressing is used to execute the native level instructions.

22. The computer system of claim 17, wherein the intermediate level instructions are compiled from the source code of an object-oriented language.

23. The computer system of claim 17, wherein the intermediate level instructions are compiled from the source code of a computer language selected from the group consisting of Java, C, C+ and C++.

24. The computer system of claim 17, wherein a Rockwell Advanced Architecture Microprocessor with at least 16 bit addressing is used to execute the native level instructions.

25. A computer system comprising
(a) a first memory wherein intermediate level instructions are stored;
(b) a second memory wherein native level instructions are stored; and
(c) circuitry for selecting a set of native level instructions to execute in response to each intermediate level instruction without a software interpreter; and
wherein the intermediate level instructions primarily use symbolic references to stored information.

26. A computer system comprising:
(a) a first memory wherein intermediate level instructions are stored:
(b) a second memory wherein native level instructions are stored; and
(c) circuitry for selecting a set of native level instructions to execute in response to each intermediate level instruction without a software interpreter; and
wherein a Rockwell Advanced Achitecture Microprocessor with at least 16 bit addressing is used to execute the native level instructions.

27. A computer system comprising:
(a) a first memory wherein intermediate level instructions are stored;
(b) a second memory wherein native level instructions are stored; and
(c) circuitry for selecting a set of native level instructions to execute in response to each intermediate level instruction without a software interpreter; and
wherein a microprocessor is used to execute the microcoded native level instructions and wherein the native level instruction set may be changed without altering the fundamental architecture of the computer system.

28. A computer system comprising:
(a) a first memory wherein intermediate level instructions are stored;
(b) a second memory wherein native level instructions are stored; and
(c) circuitry for selecting a set of native level instructions to execute in response to each intermediate level instruction without a software interpreter; and
wherein memory resident objects are partitioned into garbage-collectible and non-garage collectible types; wherein the system determines which of the garbage-collectible types will be needed during the remainder of the program execution; and
wherein the memory occupied by the unneeded garbage-collectible objects is deallocated.

29. A computer system comprising
(a) a first memory wherein intermediate level instructions are stored;
(b) a second memory wherein native level instructions are stored; and
(c) circuitry for selecting a set of native level instructions to execute in response to each intermediate level instruction without a software interpreter; and
whereinsymbolic references are resolved to logical references by a method comprising the steps of:
(a) providing an index which links all symbolically referenced items of information to a corresponding logical memory address;
(b) interpreting said intermediate level instructions;
(c) upon a first encounter of any symbolic reference within said intermediate level instructions, resolving the symbolic reference to a logical reference by searching the index and retrieving location information;
(d) storing the logical reference location information with the referenced object;
whereby subsequent encounters of any previously resolved symbolic references may use previously retrieved location information stored with the object. memory for storing the intermediate code and a second memory for storing native level code, wherein the executing step includes selecting the native level code in response to the intermediate code.

30. A computer system comprising:
(a) a compiler for compiling a high level source code to generate an intermediate code; and
(b) a microprocessor system for executing said intermediate code, said microprocessor system comprising a microprocessor and an instruction set so that said microprocessor system capable of executing said intermediate code as the native code of the microprocessor without a software interpreter;
wherein memory resident objects are partitioned into garbage-collectible and non-garbage collectible types;
wherein the system determines which of the garbage-collectible types will be needed during the remainder of the program execution; and
wherein the memory occupied by the unneeded garbage-collection objects is deallocated.

31. A computer system comprising:
(a) a compiler for compiling a high level source code to generate an intermediate code; and
(b) a microprocessor system for executing said intermediate code, said microprocessor system comprising a microprocessor and an instruction set so that said microprocessor system capable of executing said intermediate code as the native code of the microprocessor without a software interpreter;
wherein said intermediate code is characterized in that it does not require a direct knowledge of the microprocessor environment;
wherein symbolic references are resolved to logical references by a method comprising the steps of:
(a) providing an index which links all symbolically referenced items of information to a corresponding logical memory address;
(b) interpreting said intermediate level instructions;
(c) upon a first encounter of any symbolic reference within said intermediate level instructions, resolving the symbolic reference to a logical reference by searching the index and retrieving location information;
(d) storing the logical reference location information with the referenced object;
whereby subsequent encounters of any previously resolved symbolic references may use previously retrieved location information stored with the object.

32. A method of executing a high level source code, comprising:
compiling the high level source code to generate an intermediate code, the intermediate code does not require knowledge of a microprocessor environment;
executing the intermediate code with a microprocessor system, the microprocessor system comprising an instruction set so that said microprocessor system capable of executing the intermediate code without a software interpreter,
wherein the intermediate code comprises a real time embedded program.

33. The method of claim 32, wherein the microprocessor system includes a first memory for storing the intermediate code and a second memory for storing native level code, wherein the executing step includes selecting the native level code in response to the intermediate code.

34. A method of executing a high level source code, comprising:
compiling the high level source code to generate an intermediate code, the intermediate code does not require knowledge of a microprocessor environment;
executing the intermediate code with a microprocessor system, the microprocessor system comprising an instruction set so that said microprocessor system capable of executing the intermediate code without a software interpreter;
wherein the microprocessor system includes a first memory for storing the intermediate code and a second memory for storing native level code, wherein the executing step includes selecting the native level code in response to the intermediate code;
wherein the executing step includes:
(a) providing an index which links all symbolically referenced items of information to a corresponding logical memory address;
(b) interpreting said intermediate level instructions;
(c) upon a first encounter of any symbolic reference within said intermediate level instructions, resolving the symbolic reference to a logical reference by searching the index and retrieving location information;
(d) storing the logical reference location information with the referenced object;
whereby subsequent encounters of any previously resolved symbolic references may use previously retrieved location information stored with the object.

35. A computer system comprising:
(a) a compiler means for compiling a high level source code to generate an intermediate code; and
(b) a microprocessor system means for executing said intermediate code, said microprocessor system comprising a microprocessor and an instruction set so that said microprocessor system capable of executing said intermediate code as the native code of the microprocessor means without a software interpreter;
wherein said intermediate code is characterized in that it does not require a direct knowledge of the microprocessor environment, wherein the intermediate code comprises a real time embedded program.

* * * * *